(12) United States Patent
Nystad et al.

(10) Patent No.: US 8,542,939 B2
(45) Date of Patent: Sep. 24, 2013

(54) METHODS OF AND APPARATUS FOR USING TREE REPRESENTATIONS FOR REPRESENTING ARRAYS OF DATA ELEMENTS FOR ENCODING AND DECODING DATA IN DATA PROCESSING SYSTEMS

(75) Inventors: Jorn Nystad, Trondheim (NO); Oskar Flordal, Lund (SE); Jeremy Davies, Cambridge (GB)

(73) Assignee: ARM Limited, Cambridge (GB)

( * ) Notice: Subject to any disclaimer, the term of this patent is extended or adjusted under 35 U.S.C. 154(b) by 132 days.

(21) Appl. No.: 13/198,462

(22) Filed: Aug. 4, 2011

(65) Prior Publication Data
US 2013/0034309 A1   Feb. 7, 2013

(51) Int. Cl.
*G06K 9/36*   (2006.01)
*G06K 9/46*   (2006.01)
(52) U.S. Cl.
USPC ........................................ 382/240

(58) Field of Classification Search
USPC .................... 382/232, 240, 284; 375/240.18, 375/E07.226; 706/14, 45, 46
See application file for complete search history.

(56) References Cited

U.S. PATENT DOCUMENTS

| 5,159,647 | A  | * | 10/1992 | Burt ............................... 382/103 |
| 7,885,911 | B2 | * | 2/2011 | Cormode et al. ............... 706/46 |
| 2007/0237410 | A1 | * | 10/2007 | Cormode et al. ............. 382/240 |
| 2011/0249755 | A1 | * | 10/2011 | Shibahara et al. ........ 375/240.18 |

* cited by examiner

*Primary Examiner* — Amir Alavi
(74) *Attorney, Agent, or Firm* — Vierra Magen Marcus LLP

(57) ABSTRACT

To encode and compress a data array 30, the data array 30 is first divided into a plurality of blocks 31. A quadtree representation is then generated for each block 31 by initializing each leaf node of the quadtree to the value of the data element of the block 31 of the data array 30 that the leaf node corresponds to, and initializing each non-leaf node to the minimum value of its child nodes, and then subtracting from each node except the root node the value of its parent node. A set of data indicating the differences between respective parent and child node values in the quadtree representing the block of the data array is then generated and stored, together with a set of data representing a quadtree indicating the number of bits that have been used to signal the respective difference values.

30 Claims, 7 Drawing Sheets

| zerocd_1* | Assignment pattern |
|---|---|
| 0 | Z  B<br>C  A |
| 1 | B  Z<br>A  C |
| 2 | C  A<br>Z  B |
| 3 | A  C<br>B  Z |

FIG. 4

METHODS OF AND APPARATUS FOR USING TREE REPRESENTATIONS FOR REPRESENTING ARRAYS OF DATA ELEMENTS FOR ENCODING AND DECODING DATA IN DATA PROCESSING SYSTEMS

BACKGROUND

The technology described herein relates to a method of and apparatus for encoding data, e.g. for storage, in data processing systems, and in particular to such a method and apparatus for use to compress and store texture data and frame buffer data in computer graphics processing systems. It also relates to the corresponding decoding processes and apparatus.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to store such texture data in a compressed form so as to try to reduce, e.g., the storage and bandwidth burden that may be imposed on a device.

A further consideration when storing texture data (whether compressed or not) for use in graphics processing is that typically the graphics processing system will need to be able to access the stored texture data in a random access fashion (as it will not be known in advance which part or parts of the texture map will be required at any particular time). This places a further constraint on the storage of the texture data, as it is accordingly desirable to be able to store the texture data in a manner that is suitable for (and efficient for) random access to the stored data.

The Applicants believe that there remains scope for improved arrangements for compressing data for use in data processing systems, such as texture data for use in graphics processing.

BRIEF DESCRIPTION OF THE DRAWINGS

A number of embodiments of the technology described herein will now be described by way of example only and with reference to the accompanying drawings, in which:

FIG. 4 shows a set of tree node value storage patterns that are used in an embodiment of the technology described herein;

DETAILED DESCRIPTION

Figure 1:
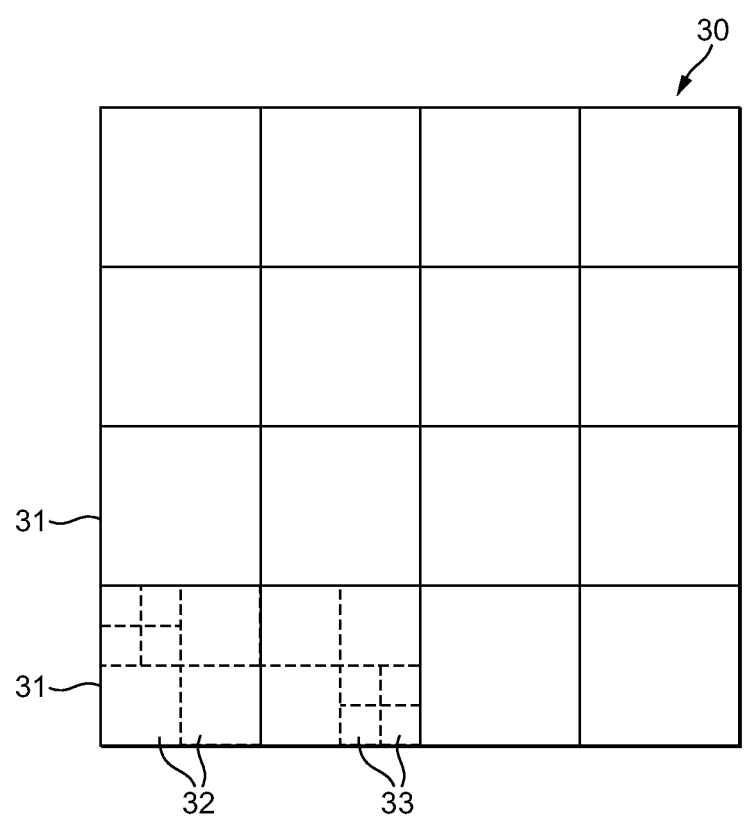
FIG. 1 shows schematically an array of data that may be encoded in accordance with an embodiment of the technology described herein.

A first embodiment of the technology described herein comprises a method of encoding an array of data elements for storage in a data processing system, the method comprising:

generating at least one tree representation for representing the array of data elements, the tree being configured such that each leaf node of the tree represents a respective data element of the data array, and the data values for the nodes of the tree being set such that the data value that the tree indicates for the data element of the data array that a leaf node of the tree represents is given by the sum of the data values in the tree for the leaf node and each preceding parent node in the branch of the tree that the leaf node belongs to; and generating and storing data representing the at least one tree representing the data array as an encoded version of the array of data elements.

A second embodiment of the technology described herein comprises an apparatus for encoding an array of data elements for storage in a data processing system, the apparatus comprising:

processing circuitry configured to:

generate at least one tree representation for representing the array of data elements, the tree being configured such that each leaf node of the tree represents a respective data element of the data array, and the data values for the nodes of the tree being set such that the data value that the tree indicates for the data element of the data array that a leaf node of the tree represents is given by the sum of the data values in the tree for the leaf node and each preceding parent node in the branch of the tree that the leaf node belongs to; and generate and store data representing the at least one tree representing the data array as an encoded version of the array of data elements.

In some embodiments, the processing circuitry may be in communication with one or more memory devices that store the data described herein and/or store software for performing the processes described herein. The processing circuitry may also be in communication with a display for displaying images based on the data described above.

A third embodiment of the technology described herein comprises a data structure (and/or data format) representing an encoded version of an array of data elements for use in a data processing system, comprising:

data representing at least one tree representation representing the array of data elements; wherein:

the at least one tree representation that the data represents is configured such that each leaf node of the tree represents a respective data element of the data array, and the data values for the nodes of the tree are set such that the data value that the tree indicates for the data element of the data array that a leaf node of the tree represents is given by the sum of the data values in the tree for the leaf node and each preceding parent node in the branch of the tree that the leaf node belongs to.

In one example implementation, the stored set of data is stored on a computer readable storage medium in the data format described above.

In some embodiments, the data representing the at least one tree representation representing the array of data elements comprises data representative of the differences between the values of respective parent and child nodes in the tree. In some embodiments, data representing at least one further tree representation in which the node values for the at least one further tree representation indicate the number of bits used to indicate respective node values in the data representing the at least one tree representation representing the data array.

In the technology described herein, an array of data elements (which may, as discussed above, be an array of texture data for use in graphics processing) is represented using a tree representation in which each leaf node of the tree represents a respective data element of the data array. Furthermore, the data values for the nodes of the tree are set such that the data value for the data element of the data array that a leaf node of the tree represents is given by the sum of the data values in the tree for the leaf node and each preceding parent node in the branch of the tree that the leaf node belongs to (in other words, to reproduce the data value for a data element that a leaf node of the tree represents, the value for the leaf node in the tree and the values for all the parent nodes in the tree along the branch in the tree that the leaf node resides on must be added together).

As will be discussed further below, representing the data array using a tree of this form facilitates using less data to represent the data array (and thereby compressing the data array relative to its original form). For example, it transforms the data array into a format that can facilitate efficient entropy coding.

In particular, because the values of the nodes in the tree are such that the data value that a leaf node represents (corresponds to) is indicated by the sum of the tree values for the leaf node and the values of all the preceding parent nodes on the branch of the tree that the leaf node resides on, each node of the tree can effectively be set to a "minimum" data value that can still allow the correct leaf node values to be determined. The tree can thus be thought of as a "minimum value" tree representation of the data array, and this "minimum value" tree representation can facilitate a compressed version of the original data array, because rather than storing, for example, the actual, original data array values for each data element in the array, a set of "minimum" values from which the actual, original data array values can be determined is stored instead.

Moreover, the compression can be lossless, because the tree can be configured such that the original value of the data element that each leaf node corresponds can be determined.

Also, as each leaf node in the tree indicates the value of a respective data element of the data array, that can facilitate random access to data elements in the compressed data.

Embodiments of the technology described herein can accordingly provide a method and apparatus for efficiently and losslessly compressing data arrays and in a way that facilitates parallel decompression with hardware-based decoders and that can fit well with a bus friendly memory layout. This can then help, e.g., to reduce the bandwidth required to communicate, e.g. image, data between different image data producing and consuming nodes in a graphics processing system, for example. This can all help to reduce issues with bus congestion and power requirements, for example.

The data array that is to be compressed in the technology described herein can be any suitable data array. It should comprise a plurality of data elements (entries), each occupying different positions in the array. The data array is in an embodiment an image (in an embodiment represents an image). As discussed above, in an embodiment the data array is a graphics texture.

However, the technology described herein is not exclusively applicable to graphics textures, and may equally be used for other forms of data array, e.g. image. For example, the Applicants believe the technology described herein may be equally useful for comprising frame buffer data (for use as a frame buffer format), e.g. in graphics processing systems and for use with display controllers. Thus, in an embodiment the data array is a frame of data to be stored in a frame buffer, e.g. for display.

In an embodiment, the technology described herein is used both to compress texture data and as the frame buffer format in a graphics processing system. Thus, the technology described herein also extends to a graphics processing system that uses the arrangement of the technology described herein both for compressing texture data and as its frame buffer format.

The technology described herein may also be used, for example, in image signal processing (image signal processors) and video encoding and decoding (video encoders and decoders).

While it would be possible to generate a single tree representation for a given data array to be compressed, in an embodiment, the data array is divided into plural separate regions or blocks, and a respective tree representation is generated for each different block (region) that the data array is divided into.

The blocks (regions) that the data array (e.g. texture) to be compressed is divided into in these arrangements can take any suitable and desired form. Each block should comprise a sub-set of the data elements (positions) in the array, i.e. correspond to a particular region of the array. In an embodiment the array is divided into non-overlapping and regularly sized and shaped blocks. The blocks are in an embodiment square, but other arrangements could be used if desired. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on.

(As is known in the art, in tile-based rendering, the two dimensional output array of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In an embodiment, the data array is divided into 16×16 blocks (i.e. blocks of 16×16 array positions (entries)). In one such arrangement, a single tree representation is generated for the 16×16 block. Thus, in the case of a texture map, for example, a separate tree representation would be generated for each (non-overlapping) 16×16 texel region of the texture map, and in the case of a frame for the frame buffer, a tree representation would be generated for each 16×16 pixel or sampling position region of the frame.

Other arrangements would, of course, be possible. For example, instead of generating a single tree representation for a 16×16 block, four trees, each representing an 8×8 or a 16×4 block within the 16×16 block could be generated (in effect therefore, the data array would be divided into 8×8 or 16×4 blocks).

The data array element data values that the tree represents and indicates, i.e. that can be derived from the tree, can take any suitable and desired form, and will depend, as will be appreciated by those skilled in the art, upon the nature of the data array being compressed, e.g. whether it is a texture, a frame for the frame buffer, etc.

In the case of a texture, for example, the data array element data values that the tree represents and indicates should be data values to allow appropriate texture data (texel values) for the data array elements that the quadtree leaf nodes represent to be determined. Such texture data could comprise, e.g., a set of colour values (Red, Green, Blue (RGB)), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or glossmaps, etc.

In the case of a frame for display, to be stored in a frame buffer, the data array element data values that the tree represents and indicates should be data values to allow appropriate pixel and/or sampling position data values for the data array elements that the tree leaf nodes represent to be determined. Such pixel data could comprise, e.g., appropriate colour (RGB) values, or luminance and chrominance values.

Where the data elements of the data array have plural components (channels) associated with them, such as would be the case, for example, for RGBa textures (in which each data element will have four values associated with it), then in an embodiment a separate tree is generated (and stored) in respect of each different data component (channel). Thus, for example, in an embodiment a separate tree is constructed for each different component of the data elements in the data array, e.g. for each of the three or four colour components that are present in the original data array. (In other words, a given tree in an embodiment represents the values of only one component (channel) of the data elements of the data array.)

The tree or trees representing the data array can be generated in any suitable and desired manner. Each node of the tree will in an embodiment have plural child nodes, each representing a respective non-overlapping and equal-sized region of the region of the data array that the parent node represents, save for the end leaf nodes that represent the individual data elements themselves.

In an embodiment, the tree representations are in the form of quadtrees, i.e. one or more quadtrees are generated to represent the data array. However, other tree structures, i.e. having greater or fewer than four children per node could be used if desired. It would also be possible to use a hybrid tree structure, for example that is a quadtree but which only has two children per node for the next to lowest layer (i.e. the leaf node parent nodes only have two child leaf nodes each).

Where the data array is represented using a quadtree or quadtrees, then each quadtree will accordingly have a root node representing the whole of the block or region of the data array that the quadtree is encoding (or the whole of the data array where a single quadtree is to be generated for the entire data array). The root node will then have four child nodes (as it is a quadtree), each representing a respective non-overlapping and equal-sized region (and in an embodiment a quadrant) of the block of the data array that the root node (that the quadtree) represents. Each child node of the root node will then have four child nodes, each representing a respective non-overlapping and equal-sized region (and in an embodiment a quadrant) of the region of the data block that the child node of the root node (that the quadtree) represents, and so on (i.e. with each node having four child nodes, each representing a respective non-overlapping and equal-sized region of the block of the data array that the parent node represents), down to the leaf nodes that represent individual data elements (e.g. texels or pixels) of the data array.

Thus, for example, in the case of a quadtree for a 16×16 data element block, there will be a root node representing the whole 16×16 block. The root node will have four child nodes, each representing an 8×8 block of data elements within the 16×16 block. Each such child node will have four child nodes, each representing a 4×4 block of data elements with the 8×8 block in question, and so on, down to the leaf nodes that represent the individual data elements.

As discussed above, the (or each) tree, e.g. quadtree, should be generated such that each leaf node of the tree corresponds to a given data element (e.g. texel or pixel) of the data array. Thus there will be one leaf node in the tree for each data element in the block (region) of the data array that the tree is to represent.

Each node of the tree (e.g. quadtree) should have a respective data value associated with it. As discussed above, the data values for the nodes of the tree are set such that the data value for the data element of the data array that a leaf node of the tree represents is given by the sum of the data values in the tree for the leaf node and of each preceding parent node in the branch of the tree that the leaf node belongs to. Thus, the data-value that is associated with and stored for each node of the tree will be (and is in an embodiment) the value that is needed to reproduce the desired leaf node values when all the node values along the branches of the tree are summed together in the appropriate fashion.

The data values that are set for and allocated to the nodes of a tree (e.g. quadtree) could be such that the sum of the node values gives an approximation to the value of the data array element that a tree leaf node corresponds to. This would then mean that the tree is a lossy representation of the original data array. However, in an embodiment, the tree or trees (e.g. quadtree or quadtrees) is generated to be a lossless representation of the original data array. Thus, in an embodiment, the data values that are generated for and allocated to the nodes of the tree(s) are such that the sums of the tree node values gives the correct, original values of the data array elements that the tree leaf nodes correspond to.

The data values to be associated with (set for) each node of the tree can be determined in any suitable and desired manner. In an embodiment, they are determined by performing two processing (data) passes.

In the first processing pass, each leaf node in the tree is initialised with (set to) the value that the tree is to indicate for the data element in the data array to be encoded that the leaf node represents (corresponds to), and each non-leaf node is initialised with (set to) a selected value that is, e.g., based on the values of the leaf nodes in the tree. This calculation is in an embodiment performed from the bottom of the tree upwards. (As discussed above, the value that the tree is to indicate for a data element in the data array, i.e. that the corresponding leaf node will be set to in this data pass, could be the actual value of that data element in the data array (for a lossless representation of the original data array), or an approximation to that actual value (where the tree is to be a lossy representation of the data array), as desired.)

The value that each non-leaf node is set to in this first processing (data) pass is in an embodiment based and/or related to, the value of its child nodes. It is in an embodiment determined in a predetermined manner from the values of its child nodes. In an embodiment, each non-leaf node is initialised with (set to) the value of one of its child nodes. In one such embodiment, each non-leaf node is initialised with (set to) the minimum value of its child nodes (to the value of its lowest value child node) in this processing pass. In another embodiment, each non-leaf node is initialised with (set to) the maximum value of its child nodes (to the value of its highest value child node) in this processing pass.

The second (subsequent) processing pass in an embodiment then subtracts from each node the value of its parent node. This is done for all nodes except the root node (which has no parent) and is again in an embodiment done in a bottom-up fashion.

The resulting node values following the second pass are then the values that are associated with (set for) each node in the tree.

The data values for the data elements that are encoded in the quadtree could be transformed (converted) to a different form prior to generating the tree representing the data array, if desired.

For example, in an embodiment, where the data array to be compressed uses an RGB format, the RGB data is first transformed to a YUV format, and it is the so-transformed data in the YUV format that is compressed and encoded in the manner of the technology described herein. In an embodiment a lossless YUV transform is used. In an embodiment the YUV transform is such that the U and V components in the transformed data are expanded by 1 bit compared to their RGB counterparts.

The YUV transform is in an embodiment of the form:

$Y = \text{floor}((R + 2*G + B)/4)$ $U = R + F - G$ $V = B + F - G$

F is a constant to avoid negative values. It is calculated from the size of G as:

$F = 1 << (\text{bit width of the } G \text{ component})$

With this transform, the Y, U and V components will be expanded by 0-2 bits compared to their RGB counterparts.

(The inverse to this transform is:
G = (4*Y – U – V + 3 + 2*F)/4
R = U + G – F
B = V + G – F
.)

Transforming RGB data to YUV data can simplify the coding of the chroma channels, as there may then be only one channel that will depict detail in the image (data array) instead of three. This can then mean that even if the amount of uncompressed data per data element is expanded (as discussed above), there will still be a gain once the data has been compressed in the manner of the technology described herein.

Once the tree, such as the quadtree, representing the data array has been generated, it is then necessary to generate data representing the tree, which data is then stored for the encoded version of the original data array. The generated and stored data representing the tree can take any suitable and desired form. However, in an embodiment it represents the tree in an encoded form. In an embodiment the data representing the tree (that is generated and stored to represent the tree) is a compressed representation of the tree that represents the data array (or part of the data array).

The stored data representing the tree, e.g. quadtree, in an embodiment includes a set of data representing or indicating the node values for the tree. This tree node value indicating data could, e.g. simply comprise the actual data values of (set for) each node in the tree, which are then stored, e.g. in some particular, e.g. predetermined, order. However, in an embodiment, the data representing the tree node values represents the tree node values in an encoded form.

In an embodiment, the tree, e.g. quadtree, representing (all or part of) the data array is encoded for storage by storing for each tree node, the difference between the value for the node in the tree and the value of the parent node for the node in question. Thus, in an embodiment for some or all of the nodes in the tree, the difference between the value for the node in the tree, and the value of the parent node in the tree for the node in question is determined, and that difference value is then used as the value that should be stored for the tree node in question in the stored, encoded version of tree (in the stored data representing the tree). The value for a given node in the tree will then correspondingly be determined from the stored representation of the tree by determining the value for the parent node of the node in question in the tree and adding the difference value indicated for the node of tree to the determined value for the parent node.

This arrangement, i.e. representing the tree, e.g. quadtree, node values by indicating the difference between the values of parent and child nodes in the tree, can allow the tree to be represented in a compressed form. In particular, the Applicants have recognised that storing difference values allows the "minimum value" tree data values to be represented in a more compact form, particularly where for at least one child node of each parent node, the difference between the child node's value and the parent node's value in the tree will be zero (such that that child node's value can be indicated in a very efficient manner, as will be discussed further below). Also, for most images (such as might be used in graphics textures, for example), the amount of bits required to describe the difference values is predictable, which can again facilitate representing and storing the tree(s) representing the data array in a compressed form.

Thus, in an embodiment, once a tree representing a block (or all) of the original data array to be encoded has been determined, a representation of that tree to be stored as the representation of the tree from which the values of the data elements in the original data array that the tree represents are to be determined is generated by determining the differences between the values of respective parent and child nodes in the tree, and then data representative of those difference values (and from which the difference values can derived) is stored as the data representing the tree.

It is also believed that using data representing difference values to represent a tree, such as a quadtree, representing a data array is new and advantageous in its own right, and irrespective, for example, of whether the tree is a "minimum value" tree or not.

Thus, a fourth embodiment of the technology described herein comprises a method of encoding an array of data elements for storage in a data processing system, the method comprising:

generating at least one tree representation for representing the array of data elements, the data values for the nodes of the tree being set such that data values for the data elements of the data array that the tree represents can be derived from the data values for the nodes of the tree;

generating data representing the at least one tree representing the data array by determining the differences between the values of respective parent and child nodes in the tree; and storing data representative of the determined difference values as a set of data representing an encoded version of the array of data elements.

A fifth embodiment of the technology described herein comprises an apparatus for encoding an array of data elements for storage in a data processing system, the apparatus comprising:

processing circuitry configured to:

generate at least one tree representation for representing the array of data elements, the data values for the nodes of the tree being set such that data values for the data elements of the data array that the tree represents can be derived from the data values for the nodes of the tree;

generate data representing the at least one tree representing the data array by determining the differences between the values of respective parent and child nodes in the tree; and store data representative of the determined difference values as a set of data representing an encoded version of the array of data elements.

In some embodiments, the processing circuitry may be in communication with one or more memory devices that store the data described herein and/or store software for performing the processes described herein. The processing circuitry may also be in communication with a display for displaying images based on the data described above.

A sixth embodiment of the technology described herein comprises a data structure representing an encoded version of an array of data elements for use in a data processing system, comprising:

data representing at least one tree representation representing the array of data elements, the data values for the nodes of the tree being set such that data values for the data elements of the data array that the tree represents can be derived from the data values for the nodes of the tree; wherein:

the data representing the at least one tree representation representing the array of data elements comprises data representative of the differences between the values of respective parent and child nodes in the tree.

As will be appreciated by those skilled in the art, these embodiments of the technology described herein can and in some embodiments do include any one or more or all of the optional features of the technology described herein, as appropriate. Thus, for example, the tree (or trees) representing the data array is in an embodiment a quadtree (or quadtrees).

The data values (e.g. difference values) that are stored for each node of the tree in the stored representation of the tree can be arranged and configured in any suitable and desired manner in the stored representation of the tree.

In an embodiment, the arrangement is such that individual node values or sets of individual node values can be extracted from the stored data representing the tree, without, e.g. having to decode the entire set of the data. This then facilitates random access to original data element values or to sets of original data element values that the stored tree represents.

In an embodiment, where each tree is a quadtree and represents a 16×16, 16×4, or 8×8 block of data elements, the arrangement is such that individual 4×4 blocks can be decoded without having to decode any other 4×4 blocks, and such that 16×16, 16×4 or 8×8 blocks can be decoded independently of other 16×16, 16×4, or 8×8 blocks, respectively. In this arrangement, the minimum granularity will be decoding a single 4×4 block. This is acceptable and efficient, as this will typically correspond to the minimum amount of data that can be fetched from memory in one operation in typical memory subsystems.

Such arrangements could be achieved, for example, by allocating, a fixed size, known position, field within the set of data representing the tree for each node value or set of node values. However, this may not be the most efficient arrangement from a data compression point of view.

Thus, in an embodiment, the data values (e.g. the difference values) for the nodes of a tree representing all or part of the data array can be (and are) stored in variable-sized fields within the set of data representing the tree node values, in an embodiment in a contiguous fashion. This can allow the data representing the tree to be stored in a more compressed form.

Where the data values for the tree nodes are stored in variable sized fields in the set of data representing those values, then the position within the set of data representing the tree node values of the field (the bits) representing the value (e.g. difference value) for a given node of the tree will not be at a fixed or predetermined position. A decoder decoding the stored data representing the tree may therefore need to be able to identify (e.g. determine the position of) the data for a given tree node in use. This could be done in any desired and suitable manner.

However, in an embodiment, the generated and stored data representing the tree, as well as including a set of data indicating the tree node values (e.g., by indicating difference values to allow the tree node values to be determined), as discussed above, also includes a set of data to be used when (and for) identifying the data for each respective tree node in the set of data indicating the tree node values. This set of node value identifying data can then be used by a decoder for identifying the data for a given tree node within the stored set of data representing the tree node values.

The node value identifying data can take any suitable and desired form. In an embodiment, it indicates the number of bits that have been used for the respective node values in the set of data representing the tree node values. Thus, in an embodiment, the data representing the tree representing the data array includes an indication of the number of bits (a bit count) that has been used to represent (signal) the value of each node in the tree in the tree representing data. Accordingly, when the tree node values are stored in the form of a set of difference values, as discussed above, the node value identifying data will comprise an indication of the number of bits (a bit count) used in the stored representation of the tree to signal the difference value for each node of the tree.

Thus, the data that is generated and stored to represent the tree (or each tree) representing the data array in an embodiment comprises a set of data representing the tree node values (and from which the tree node values can be derived), together with a set of data indicating the number of bits (a bit count) that has been used to represent (signal) the value of each node in the tree in the set of data representing the tree node values.

The data indicating the number of bits (the bit count) used in the stored representation of the tree to signal the, e.g. difference, values for each node of the tree can be arranged and configured in the data representing the tree in any desired and suitable manner. However, in an embodiment, it too is arranged as a tree representation, with the nodes of the "bit count" tree indicating the number of bits used in the set of data indicating the tree node values for corresponding nodes in the tree representing the data array.

Thus, in an embodiment, the data representing the tree representing the data array that is generated and stored in the technology described herein comprises data indicating node values for the tree representing the data array, and data representing a tree that indicates the number of bits (the bit count) used to indicate the respective node values in the data indicating the node values for the tree representing the data array. In other words, in an embodiment a "bit count" tree indicating the amount of bits used to signal the tree node values (e.g. difference values, as discussed above) in the stored representation of the tree is generated and then data representing that "bit" count tree is stored and maintained in parallel with the set of data representing (indicating) the tree node values (and from which the values of the data array elements that the tree represents will be determined).

The Applicants have found that using such a "bit count" tree together with data representing the node values of the tree representing the data array can allow the tree representation of the original data array to be compressed in an efficient manner, particularly where the stored tree node values indicate difference values, as discussed above.

Indeed, it is believed that such an arrangement that uses parallel data value and "bit count" tree representations could be new and advantageous in its own right.

Thus, a seventh embodiment of the technology described herein comprises a method of generating an encoded version of an array of data elements for storage in a data processing system, the method comprising:

generating at least one tree representation for representing the array of data elements, the data values for the nodes of the tree being set such that data values for the data elements of the data array that the tree represents can be derived from the data values for the nodes of the tree;

generating data representing the node values of the at least one tree representing the data array;

generating at least one further tree representation in which the node values for the at least one further tree indicate the number of bits used to indicate respective node values in the data generated to represent the node values of the at least one tree representing the data array;

generating data representing the at least one further tree indicating the number of bits used to indicate the respective node values in the data generated to represent the node values of the at least one tree representing the data array; and storing the generated data representing the node values of the at least one tree representing the data array and the generated data representing the at least one further tree indicating the number of bits used to indicate the respective node values in the data generated to represent the node values of the at least one tree representing the data array, as an encoded version of the array of data elements.

An eighth embodiment of the technology described herein comprises an apparatus for generating an encoded version of an array of data elements for storage in a data processing system, the apparatus comprising:

processing circuitry configured to:

generate at least one tree representation for representing the array of data elements, the data values for the nodes of the tree being set such that data values for the data elements of the data array that the tree represents can be derived from the data values for the nodes of the tree;

generate data representing the node values of the at least one tree representing the data array;

generate at least one further tree representation in which the node values for the at least one further tree indicate the number of bits used to indicate respective node values in the data generated to represent the node values of the at least one tree representing the data array;

generate data representing the at least one further tree indicating the number of bits used to indicate the respective node values in the data generated to represent the node values of the at least one tree representing the data array; and store the generated data representing the node values of the at least one tree representing the data array and the generated data representing the at least one further tree indicating the number of bits used to indicate the respective node values in the data generated to represent the node values of the at least one tree representing the data array, as an encoded version of the array of data elements.

In some embodiments, the processing circuitry may be in communication with one or more memory devices that store the data described herein and/or store software for performing the processes described herein. The processing circuitry may also be in communication with a display for displaying images based on the data described above.

A ninth embodiment of the technology described herein comprises a data structure representing an encoded version of an array of data elements for use in a data processing system, comprising:

data representing at least one tree representation representing the array of data elements, the data values for the nodes of the tree being set such that data values for the data elements of the data array that the tree represents can be derived from the data values for the nodes of the tree; wherein:

the data representing at least one tree representation representing the array of data elements, comprises:

data representing the node values of the at least one tree representing the data array; and data representing at least one further tree representation in which the node values for the at least one further tree indicate the number of bits used to indicate respective node values in the data representing the node values of the at least one tree representing the data array.

As will be appreciated by those skilled in the art, these embodiments of the technology described herein can, and in some embodiments do, include any one or more or all of the optional features of the technology described herein, as appropriate. Thus, for example, the respective tree representations are in an embodiment in the form of quadtrees.

In these embodiments, the "bit count" tree or trees can be configured in any suitable and desired manner. The bit count tree or trees in an embodiment have the same or a similar configuration to the tree (or trees) representing the data array (but in an embodiment with one level of nodes less than the corresponding tree representing the data array). Thus, where one or more quadtrees are used to represent the data array, the bit count trees are in an embodiment also in the form of quadtrees. Thus, in an embodiment, the bit count tree(s) are in the form of quadtrees (in which case each node of a bit count quadtree will have four child nodes, save for the end leaf nodes of the quadtree). It would also be possible, e.g., to have bit count trees that are more or less sparse than the tree (or trees) representing the data array.

As discussed above, the data values for the nodes of a bit count tree (e.g. quadtree) are in an embodiment set such that the number of bits used to signal the value of a corresponding (associated) node or nodes of the tree (e.g. quadtree) representing the data array in the set of data representing those tree node values can be determined. Thus, the data-value that is associated with and stored for a node of the bit count tree is in an embodiment a value that can be used either on its own, or in combination with other node values in the bit count tree, to determine the number of bits used to signal the value of a corresponding node or nodes in the tree representing the data array in the set of data representing the node values of the tree representing the data array.

In an embodiment, the bit count tree (or trees) is configured such that each node of the bit count tree indicates the number of bits used to signal each child node value of a corresponding node of the tree representing the data array that is indicated in the data representing the tree representing the data array. Thus, for example, a bit count tree node value of 3 will indicate that three bits have been used for each child node value (have been used to signal each child node value) that is (explicitly) indicated in the data representing the tree representing the data array of the node of the tree representing the data array that the bit count tree node corresponds to.

Accordingly, in an embodiment, the same number of bits is used for each child node (is used to signal the value of each child node) of a given node of the tree representing the data array whose value is indicated in the set of data representing the node values of the tree representing the data array, and it is that same number of bits that a given (and the appropriate) node in the bit count tree indicates.

Thus, each "bit count" tree in an embodiment has a root node whose value will indicate or allow to be derived the number of bits used for the value of each child node of the root node that is indicated in the set of data representing the node values for the tree representing the data array. The bit count tree root node will then have four child nodes, each child node indicating or allowing to be derived, the number of bits used for the value of each child node of a respective (and in an embodiment corresponding) child node of the root node in the tree representing the data array that is included in the set of data representing the node values for the tree representing the data array. Each child node of the bit count tree root node will then have four child nodes, each such child node indicating or allowing to be derived, the number of bits used for the value of each child node of a respective child node of the child node of the root node in the tree representing the data array that is included in the set of data representing the node values for the tree representing the data array, and so on (i.e. with each bit count tree node having four child nodes, each child node indicating or allowing to be derived, the number of bits used for the value of each child node of a respective corresponding node in the tree representing the data array that is included in the set of data representing the node values for the tree representing the data array), down to the leaf nodes in the bit count tree that indicate or allow to be derived, the number of bits used for the value of the each leaf node of a given (and respective) leaf node parent node in the tree representing the data array that is included in the set of data representing the node values for the tree representing the data array.

Thus, for example, in the case of a quadtree that represents a 16×16 data element block (array), the corresponding "bit count" tree is in an embodiment a quadtree and in an embodiment has a root node whose value will indicate or allow to be derived, the number of bits used for the value of each child node of the root node representing the whole 16×16 block that is included in the set of data representing the node values for the quadtree representing the data array. The bit count quadtree root node will then have four child nodes, each such child node indicating or allowing to be derived, the number of bits used for the value of each child node of a respective and corresponding node representing an 8×8 block of data elements that is included in the set of data representing the node values for the quadtree representing the data array. Each child node of the root node in the bit count quadtree will then have four child nodes, each such child node indicating or allowing to be derived, the number of bits used for the value of each child node of a respective and corresponding node representing a 4×4 block of data elements that is included in the set of data representing the node values for the quadtree representing the data array, and so on, down to the leaf nodes of the bit count quadtree that will each indicate or allow to be derived the number of bits used for the value of each leaf node of a respective and corresponding set of four leaf nodes (as it is a quadtree) that represent the individual data elements that is included in the set of data representing the node values for the quadtree representing the data array.

It will be appreciated here that in these arrangements, the bit count tree will not signal the number of bits used for the root node value of the tree indicating the data values of the data array. That root node value is in an embodiment signalled using the same number of bits as the input data element format uses. This number of bits can, if necessary, be communicated to the decoder in some other way, for example by setting it in a data register that the decoder can read, or by including it in a file header associated with the encoded data array, etc. (All the blocks for a given data array in an embodiment have the same size of root node.)

The data that is generated and stored to represent the bit count quadtree can indicate and represent the node values for the bit count quadtree in any suitable and desired manner.

For example, the data representing the bit count tree could store for each node in the bit count tree, the "true" bit count (the number of bits) used for representing the data values for the corresponding nodes in the data representing the node values of the tree representing the data array. However, in an embodiment, the data representing the bit count tree represents the bit count tree in an encoded form. In an embodiment, the data values for the nodes of the bit count tree are stored in an encoded form. In an embodiment the data representing the bit count tree (that is stored to represent the bit count tree) is an encoded representation of the bit count tree.

In an embodiment, the bit count tree is encoded for storage by storing for the bit count tree nodes other than the root node, the difference between the bit count value (i.e. the number of bits the node is to indicate) for the node in the bit count tree and the bit count value of its parent node in the bit count tree.

Thus, in an embodiment, for some or all of the nodes in the bit count tree, the difference between the bit count value that the node in the bit count tree is to indicate, and the bit count value that the node's parent node in the bit count tree is to indicate is determined, and that difference value is then used as the value that should be stored for the bit count tree node in question in the stored, encoded version of the bit count tree. The bit count value indicated by a given node in the bit count tree will then correspondingly be determined from the stored representation of the bit count tree by determining the bit count value for the parent node of the node in question in the bit count tree, and then adding the difference value indicated for the node of the bit count tree to the determined bit count value for its parent node.

This arrangement (i.e. representing the bit count tree node values by indicating the difference between the bit count values of parent and child nodes in the bit count tree) can allow the bit count tree to be represented in a compressed form.

Thus, in an embodiment, the data that is generated and stored to represent the bit count tree comprises data representative of the differences between the bit count values to be indicated by respective parent and child nodes in the bit count tree (and from which the difference values can derived) for every node of the bit count tree except the root node (which should have its actual bit count value (i.e. the actual number of bits that has been used to signal the value of each child node of the root node in the data representing the node values for the tree representing the data array) stored for it in the data representing the bit count tree).

Thus, in an embodiment, the bit count value to be indicated for the root node of the "bit count" tree (i.e. the node of the bit count tree that indicates how many bits have been used to signal the value of each child node of the root node of the tree representing the data array in the set of data representing those node values) is given as the actual bit count (number of bits) that has been used for those values (for each of those values) in the set of data representing the node values of the tree representing the data array (i.e. the root node bit count is given in an uncompressed form in the data representing the bit count tree).

However, the data values for the remaining nodes in the bit count tree are given in the data representing the bit count tree as difference values, indicating the difference in the bit count for the node in question, compared to its parent node.

The values (e.g. difference values) that are stored for the nodes of the bit count tree in the stored (e.g. compressed) representation of the bit count tree can be arranged and configured in any suitable and desired manner in the stored representation of the bit count tree.

In an embodiment, the arrangement is such that individual node values or sets of individual node values can be extracted from the stored data representing the tree, without, e.g., having to decode the entire set of the data. This then facilitates random access to bit count values or to sets of bit count values that the stored bit count tree represents.

As discussed above, in an embodiment, where each tree is a quadtree and represents a 16×16, 16×4 or 8×8 block of data elements, the arrangement is such that individual 4×4 blocks can be decoded without having to decode any other 4×4 blocks, and such that 16×16, 16×4 or 8×8 blocks can be decoded independently of other 16×16, 16×4 or 8×8 blocks, respectively. In this arrangement, the minimum granularity will be decoding a single 4×4 block. This is acceptable and efficient, as this will typically correspond to the minimum amount of data that can be fetched from memory in one operation in typical memory subsystems.

Such arrangements can be achieved in any suitable and desired manner, but in an embodiment are achieved by allocating fixed-size, known position, fields within the set of data representing the bit count tree to each node value other than the root node.

The Applicants have found that storing the data representing the bit count tree in this form, particularly when in combination with storing the data representing the node values for the tree representing the data array in the form discussed above, can provide a compressed, but still efficient to access, representation of the original data array.

In particular, this arrangement can facilitate determining where the individual data value syntax elements are in the stored data representing the tree representing the array of data elements with relatively less serial processing compared to other entropy encoding schemes, such as Huffman coding or Arithmetic coding, whilst still being able to provide relatively high (and lossless, if desired) compression of the original data array.

In an embodiment, the data values for the non-root nodes in the bit count tree are indicated in the data representing the bit count tree using fixed, in an embodiment predetermined, and in an embodiment identical, size fields in the data representing the bit count tree. Thus, in an embodiment the value for each non-root node in the bit count tree whose value is indicated in the data representing the bit count tree is indicated by using the same, fixed number of bits for each such node.

This then allows a decoder to readily determine where the relevant bit count tree node values are in the data representing the bit count tree.

In an embodiment, the value for each non-root node bit count is indicated using a 2-bit value in the data representing the bit count tree, in an embodiment using a 2-bit signed value. Accordingly, in an embodiment the value for each non-root node bit count difference is indicated using a 2-bit value in the data representing the bit count tree, in an embodiment using a 2-bit signed value.

In an embodiment, certain bit count values that can be indicated by the bit count tree indicate predetermined, e.g. special, cases and/or sets of node values in the tree representing the data array. This can then be used to further compress the data representing the node values in the tree representing the data array and/or the data representing the bit count tree (and thus to further compress the stored data that represents the tree representing the data array).

For example, in an embodiment one bit count tree node value (e.g., one of the values that can be indicated by the fixed sized bit count node value indicating field) is set aside for indicating (and predefined as indicating) that the value of that node of the tree representing the data array, and that the value of all the child nodes of the tree representing the data array below that node, have the same value as the parent node of the tree representing the data array for the node in question.

In an embodiment the bit count value −1 is set aside for this purpose, particularly where the bit count for each non-root node is indicated using a 2-bit signed value.

This then allows the data representing the bit count tree to efficiently indicate the situation where all the leaf node values along a branch of the tree representing the data array will be the same as a given value indicated for a node of the tree that is closer to the root node of the tree representing the data array.

In an embodiment, this bit count tree node value indicating that a node of the tree representing the data array, and that all the child nodes of the tree representing the data array below that node, have the same value as the parent node of the node of the tree representing the data array in question, also indicates (and is also taken as indicating) that no bit count values are stored in the data representing the bit count tree for the nodes of the bit count tree that are below the node in question (and, accordingly, in an embodiment, no bit count values are stored in the data representing the bit count tree for the nodes of the bit count tree that are below the node in question). This is possible because as the lower level child node values will all be the same as the higher level parent node, any information relating to those child nodes is redundant and can therefore be omitted.

In effect therefore, this arrangement will trigger the decoder to assume that each lower level child node of the bit count tree also has its bit count node value set to the predetermined value, such as −1, that indicates that that node, and all the child nodes below that node, in the tree representing the data array have the same value as the parent node for the node in question.

Similarly, in an embodiment, this bit count tree node value indicating that a node of the tree representing the data array, and that all the child nodes of the tree representing the data array below that node, have the same value as the parent node of the node of the tree representing the data array in question, correspondingly also or instead indicates (and is taken as indicating) that no node values are stored in the data representing the node values of the tree that represents the data array for the nodes of the tree representing the data array that are below the node in question (and, accordingly, in an embodiment, no node values are stored in the data representing the node values of the tree that represents the data array for the nodes of the tree representing the data array that are below the node in question). Again, this is possible because as the lower level child node values will all be the same as the higher level parent node, any information relating to those child nodes is redundant and can therefore be omitted.

In effect therefore, this arrangement will trigger the decoder to assume that the corresponding node of the tree representing the data array, and all the child nodes below that node in the tree representing the data array, have the same value as the parent node in the tree representing the data array for the node in question.

Similarly, in an embodiment one bit count tree node value (e.g., one of the values that can be indicated by the fixed sized bit count node value indicating field) is set aside for indicating (and predefined as indicating) that all the child nodes of a node of the tree representing the data array have the same value as the node in question.

In an embodiment the bit count value 0 is set aside for this purpose, particularly where the bit count for each non-root node is indicated using a 2-bit signed value.

This then allows the data representing the bit count tree to efficiently indicate the situation where all the child nodes of a node of the tree representing the data array will have the same value as their parent node in the tree representing the data array.

In an embodiment, this bit count tree node value indicating that all the child nodes of a node of the tree representing the data array have the same value as their parent node also indicates (and is also taken as indicating) that no node values are stored in the data representing the node values of the tree that represents the data array for the child nodes of the node in question (and, accordingly, in an embodiment, no node values are stored in the data representing the node values of the tree that represents the data array for the child nodes of the node in question). Again, this is possible because as the child node values will all be the same as their parent node, any information relating to those child nodes is redundant and can therefore be omitted.

In effect therefore, this arrangement will trigger the decoder to assume that all the child nodes of the node in question in the tree representing the data array have the same value as their parent node.

In an embodiment, one bit count tree node value (e.g., one of the values that can be indicated by the fixed sized bit count node value indicating field) is set aside for indicating (and predefined as indicating) that the values of all the child nodes of a node of the tree representing the data array differ from the value of that node of the tree representing the data array by zero or one.

In an embodiment the bit count value 1 is set aside for this purpose, particularly where the bit count for each non-root node is indicated using a 2-bit signed value.

This then allows the data representing the bit count tree to efficiently indicate the situation where all the child nodes of a node of the tree representing the data array will differ from the value of their parent node in the tree representing the data array by zero or one.

In an embodiment, this bit count tree node value indicating that the values of all the child nodes of a node of the tree representing the data array differ from the value of their parent node by zero or one also indicates (and is also taken as indicating) that the node values for the child nodes of the node in question will be represented in the data representing the node values of the tree that represents the data array using a bit map which has one bit for each child node (and with the value of each child node being determined as the value of the parent node plus the value of the bit in the bit map for that node).

Accordingly, in this situation, the child node values for the node of the tree representing the data array in question are in an embodiment represented (and indicated) in the data representing the node values of the tree representing the data array with a bit map having one bit for each child node, and with the value of each child node being determined as the value of the parent node plus the value of the bit in the bit map for that node (i.e. by including such a bit map in the data representing the node values of the tree representing the data array).

This allows the child node values in this situation to be indicated in an efficient manner.

The above describes (the encoding of) special cases where all the child nodes of a node of the tree representing the data array have the same value as, or only differ in value by one from, their parent node. However, there may also be (and typically will also be) situations in which one or more child nodes of the tree representing the data array differ in value from their parent node by more than one.

Accordingly, in an embodiment (at least one) one bit count tree node value (e.g., one of the values that can be indicated by the fixed sized bit count node value indicating field) is set aside for this situation, i.e. for indicating (and predefined as indicating) that the value of at least one child node of a node of the tree representing the data array differs from the value of that node of the tree representing the data array by more than one.

In an embodiment the bit count value >=2 is set aside for this purpose, particularly where the bit count for each non-root node is indicated using a 2-bit signed value.

This then allows the data representing the bit count tree to efficiently indicate the situation where at least one child node of a node of the tree representing the data array differs from the value of its parent node in the tree representing the data array by more than one.

As discussed above, even in this situation where at least one child node of a node of the tree representing the data array differs from the value of its parent node by more than one, in some embodiments of the technology described herein at least (i.e. where each parent node of the tree representing the data array is initialised to a value of one of its child nodes (such as the value of its minimum or maximum value child node) there will be at least one other child node of that parent node (of the node in question) that has the same value as the parent node (as the node in question), because of the way the tree representing the data array is configured.

The Applicants have further recognised that this means that it is not necessary to store any data value for that "zero difference" child node in the stored data representing the tree node values (since its value will be the same as its parent node).

Thus, if a node of the tree representing the data array has a child node whose value differs from it by more than one, the encoding process in an embodiment identifies a child node of that parent node (of the node of the tree representing the data array in question) that has the same value as that parent node (i.e. a "zero difference" child node), and then stores in the data representing the node values of the tree representing the data array, data representing the values of the other child nodes of the node in question, but does not store any data explicitly indicating the value of the identified "zero difference" child node. Thus, in the case where a quadtree is used to represent the data array, data representing the values of three child nodes will be stored using for each of these child node values the number of bits indicated by the bit count tree, but no data value will be stored for the identified "zero difference" child node. This can help to further compress the data array.

To facilitate decoding of the data representing the tree node values in this situation, in an embodiment the values (e.g. difference values) for the non-zero difference child nodes of a node of the tree representing the data array are stored in a predetermined sequence (order) relative to the child node with zero difference to the parent node (i.e. for which no data value is stored) in the data representing the node values of the tree representing the data array. The predetermined sequence (order) in an embodiment depends upon which of the four child nodes is the "zero difference" child node. This then means that a decoder can straightforwardly determine the order in which the data representing the node values is stored in the stored data representing the tree node values, once it knows which child node of a tree node is the "zero difference" child node for which no value has been stored.

The designated "zero difference" child node can be indicated to the decoder as desired. However, in an embodiment, this information is included in the set of data representing (indicating) the node values of the tree representing the data array. For example, in the case of quadtree, a 2-bit "zero child" designator could be, and is in an embodiment, included in the set of data representing (indicating) the node values of tree representing the data array (and, e.g., then followed by bit fields indicating the values of each of the three remaining child nodes of the node in question, in the predetermined order that is appropriate to the "zero child" node in question (and using for each of those bit fields, the number of bits indicated by the corresponding bit count tree)).

Thus, the stored data representing the node values of the tree representing the data array accordingly in an embodiment includes, for one or more nodes of the tree, an indication of which child node of the respective node of the tree has been designated as a "zero difference" child node for which no value has been stored in the data representing the node values of the tree representing the data array.

The above describes the layout and configuration of the bit count tree and some arrangements of the data that is stored for representing the bit count tree. The bit count tree itself can be generated in any suitable and desired manner from the tree representing the data array. For example, once the value to be stored for each node of the tree representing the data array has been determined, the actual bit count needed to indicate the value of each node of the tree representing the data array could be determined, and then used as the node values to be stored for (to populate) the bit count tree.

However, the Applicants have recognised that in arrangements, as discussed above, where a constrained, and fixed, number of bits, such as a 2-bit signed value, is used to indicate the bit counts for the respective nodes of the bit count tree, then the actual bit count (number of bits) required for indicating the value of a given node of the tree representing the data array may in fact be smaller or larger than what it is possible to signal with the fixed size bit count field to be used in the representation of the bit count tree.

To take account of this, in an embodiment, the data representing the node values of the tree representing the data array tree is constrained such that for each node, the number of bits that is used to signal the value for that node in the data representing the node values of the tree representing the data array is a number of bits (a bit count) that can be indicated using the fixed size bit count node fields to be used for the bit count tree.

Thus, for example, where the bit counts are indicated using a signed 2-bit difference value, the data representing the node values of the tree representing the data array is in an embodiment constrained to make sure that the number of bits used for the value of each node except for the root node, in the data representing the node values of the tree representing the data array, is no smaller than the bit count of its largest child node minus one, and no smaller than the bit count of its parent node minus two.

Such constraint on the number of bits used to signal the data values for the tree representing the data array can be achieved in any suitable and desired manner. In an embodiment, it is done by performing two data passes.

First, a bottom-up pass is performed, in which for each node of the bit count tree, except the root node, the bit count for the node is constrained to be no smaller relative to the bit count of its largest child node than the value that the bit count tree configuration can indicate. This is in an embodiment done by increasing the node's bit count by whatever amount is necessary to satisfy the constraint.

Following this first pass, a second pass is then performed from the top-down. In this second pass, the bit count for each node is constrained to be no smaller relative to the bit count of its parent node than the value that the bit count tree configuration can indicate. This is again in an embodiment achieved by increasing the node's bit count by whatever amount is necessary to satisfy the constraint.

Thus, where the bit count tree uses signed 2-bit values to indicate bit count differences for all nodes except the root node, in the first bottom-up pass, for each node of the bit count tree, except the root node, the bit count for the node is in an embodiment constrained to be no smaller than the bit count of its largest child node minus one (in an embodiment by increasing the node's bit count by whatever amount is necessary to satisfy the constraint), and in the second, top-down pass, the bit count for each node is in an embodiment constrained to be no smaller than the bit count of its parent node minus two (again in an embodiment by increasing the node's bit count by whatever amount is necessary to satisfy the constraint).

The resulting node bit count values following the second pass are then the values that are associated with (set for) each node in the bit count tree. A set of data representing (encoding) the bit count tree can then be generated and stored, e.g., in the manner discussed above.

Similarly, once the bit count tree has been derived, the data representing the node values for the tree representing the data array can be generated and configured, using the configuration (such as node value field sizes) corresponding to, and indicated by, the bit count tree.

In this regard, where, as discussed above, constraints on the number of bits used to indicate the node values of the tree representing the data array are imposed, then the set of data representing the node values of the tree representing the data array should correspondingly use the determined number of bits for each respective node value. If necessary, the stored data representing the node values can be padded with zeros (or some other recognisable "dummy" bits) to achieve this. (It will be appreciated in this regard that this arrangement accordingly may mean that the set of data representing the node values of the tree representing the data array may for certain node values include more bits than the minimum necessary to convey the node value. However, the Applicants believe that not withstanding this, the technology described herein can still provide a compressed version of the original data array, and still yield better compression than when using, for example, other node value and bit count tree arrangements.)

It will be appreciated from the above, that the technology described herein, in some embodiments at least, in effect provides an entropy coding system for storing and representing the tree, e.g., quadtree, representing the data array, i.e. an encoding system in which the syntax elements (namely the nodes of the tree representing the data array and of the bit count tree) are mapped to sequences of bits with a fixed length and may be placed in a continuous fashion in memory. Thus, the technology described herein, in some embodiments at least, finds an efficient way of representing the data array with bit values. Thus, in an embodiment of the technology described herein, the data representing at least one tree representing the data array is generated using an entropy coding scheme.

The data for the data array can be processed to generate the tree representing the data array in any suitable and desired manner. For example, a suitable processor or processing circuitry may read the original data array to be compressed from memory, and/or receive a stream of data corresponding to the original data array to be compressed, and then process the stream of data accordingly, e.g. to divide it into blocks, generate the necessary tree or trees, and then generate data representing the quadtree(s) (and store that tree-representing data in memory), etc.

As discussed above, in an embodiment, this process will accordingly first comprise generating for the data array, or for each block that the data array has been divided into, a "minimum value" tree (e.g. quadtree) having the form described above, in which the leaf nodes of the tree correspond to respective data elements of the data array (or block of the data array). In an embodiment a bit count tree (e.g. quadtree) of the form described above is then derived, based on the number of bits that are needed to indicate, and/or that will be used to indicate, the value of each node of the minimum value tree in a set of data representing the node values of that minimum value tree. A set of data representing that bit count tree is in an embodiment then generated, together with a set of data representing the node values of the minimum value tree, which set of node value indicating data is configured according to, and has the configuration indicated by, the corresponding bit count tree.

In an embodiment, this process further comprises identifying special cases of minimum value tree node values, for example, as discussed above, and configuring the bit count tree to indicate those special cases, and the set of data representing the minimum value tree node values accordingly.

The data representing the tree representing the data array, such as the set of data representing the tree node values and the set of data representing the corresponding bit count tree, is in an embodiment then stored appropriately for use as the compressed set of data representing the data array.

In an embodiment the system of the technology described herein employs arithmetic wrapping, i.e. the result of all additions when calculating the value of a node in the tree representing the data array is in an embodiment calculated modulo (1<<bit depth of the (potentially yuv transformed) component).

Furthermore, the Applicants have recognised that when using such wrapping arithmetic, the rate of compression may be improved by exploiting the use of the wrapping arithmetic, in particular, for example, for high contrast images, such as text and schematics.

For example, the Applicants have recognised that in some circumstances by initialising each parent node in the tree representing the data array to a value that is higher than the minimum value of its child nodes, and then storing differences relative to that higher value for the child nodes, and using arithmetic wrapping of the results when the stored node values are summed to derive the actual child node values, the compression may be improved.

For example, in an image that consists of mostly black or white data elements (such as could be the case for high contrast images (data arrays) like text and schematics), it may be better to initialise each non-leaf node value (if a node has a "white value" child) to the higher "white" value and signal the dark data elements using the arithmetic wrap-around, as the counting distance for example between the "white" and "dark" values when using wrapping arithmetic may be less than the counting distance between the "dark" and "white" values.

For example, if the data array contains only the numbers 0 (dark) and 255 (white), then if using 8-bit arithmetic with arithmetic wrapping, it would be more efficient to initialise any non-leaf nodes that have a child node having the value 255 to 255, and to rely on arithmetic wrapping (i.e. 255+1=0 when utilising 8-bit arithmetic) to generate the desired node values when decoding the stored data. In this particular example, each parent node in the tree representing the data array will accordingly be initialised to the maximum value of its child nodes (to the value of its highest child node), rather than to the minimum value of its child nodes.

This will then allow smaller difference values (1 instead of 255) to be used to represent the node values in the data representing the node values of the tree representing the data array, and thus allow smaller numbers of bits to be used to describe (signal) the differences (the difference values) (i.e. 1 bit instead of 8 bits). Such arrangements can accordingly use significantly less bits for images that have this kind of characteristic.

This can thereby decrease the number of bits that are needed to convey the difference values in the set of data representing the node values of the tree representing the data array.

Thus, in an embodiment, the values that the non-leaf nodes in the tree representing the data array are initialised to are set so as to minimise the differences between those values (and thus the differences that will need to be stored for the nodes) when taking account of any wrapping arithmetic that is used in the system in question (and the system will rely on arithmetic wrapping to determine the actual node values when decoding the stored data).

In these arrangements each non-leaf node is in an embodiment still initially set to the value of one of its child nodes, but rather than, e.g., always initially setting it to the minimum value of its child nodes, it is in an embodiment initially set to the lowest value of its child nodes that is equal to or greater than a selected threshold minimum value (i.e. to the value of its lowest value child node whose value is equal to or above a selected threshold minimum value). Thus, in these arrangements, each non-leaf node will be initially set (e.g. in the first processing pass discussed above) to the minimum value of its child nodes that is equal to or greater than a selected threshold minimum value (i.e. to the value of the lowest value child node whose value is equal to or above a selected threshold minimum value).

Where the threshold minimum value is greater than zero (as may typically be the case in these arrangements), each non-leaf node may accordingly typically be initially set to the value of one of its non-minimum value child nodes (unless all its child nodes have the same value, in which case it will be initially set to that value).

In this case, a non-leaf node will be initially set (e.g. in the first processing pass discussed above) to a value that is higher than the minimum value of its child nodes (i.e. to the value of one of its higher value child nodes). Thus, in an embodiment, at least one non-leaf node in the tree representing the data array is initialised to a value that is higher than the minimum value of its child nodes, such as to the maximum value of its child nodes.

In these arrangements, the threshold minimum value to be used when initialising the non-leaf node values to use to exploit the arithmetic wrapping efficiently can be determined in any desired and suitable manner. For example, some or all of the leaf node values for the tree could be binned into a fixed amount of bins (such as four bins), and then the threshold minimum value to be used when initialising the non-leaf node values set as being the value of a child node (and in an embodiment of the lowest value child node) in the bin that has the lowest total distance (in normal counting order) to the other filled bins (to the values of the other child nodes). This will then generate a threshold minimum value that should have the minimum differences to all the other possible node values.

Thus, in an embodiment, a threshold minimum value for the tree representing the data array is determined based on the leaf node values to be used in the tree, and then the value each non-leaf node is to be initialised to is determined using (based on) that determined threshold minimum value (in an embodiment by initialising the non-leaf nodes to the lowest value of their child nodes that is equal to or greater than the determined threshold minimum value (i.e. to the value of the lowest value child node whose value is equal to or above the selected threshold minimum value).

The determination of the lowest value child node whose value is equal to or above the threshold minimum value should, and in an embodiment does, take account of and use arithmetic wrapping, such that if there is no child node value between the threshold value and the upper limit of the arithmetic range, the determination should "wrap" back to zero and find (and select) the next child node value starting at zero. (The effect of this then will be that when none of the child node values for a node is above (higher than) the threshold minimum value, the node should and will be initialised to the minimum value of its child nodes.)

Essentially therefore, the process selects the child node value that is equal to or above (in the counting order, with wrapping), and closest to, the selected (determined) threshold value as the value to initialise the parent node to. Thus, each non-leaf node is in an embodiment initially set (e.g. in the first processing pass discussed above) to its child node value that is equal to or above (in the counting order, with wrapping) and closest to the selected (determined) threshold value. Thus, in an embodiment, the non-leaf nodes in the tree representing the data array are each initialised to the value of their child node whose value is equal to or above (in the counting order, with wrapping) and closest to the selected (determined) threshold value.

In these arrangements, the root node of the tree representing the data array will accordingly be, and is in an embodiment, set to the selected (determined) threshold minimum value.

These arrangements will be particularly useful where the values that the data elements in the data array can take tend to be grouped, e.g., as high and low values, rather than being spread more evenly across the possible data value range, such as could be the case for text, schematics, purely black and white images, etc.

It should also be noted here that in arrangements where each parent node is set to the minimum value of its child nodes, that is equivalent to setting the threshold minimum value to be used when determining the node values to zero (where all the node values (data element values) are zero or greater). Thus, in one embodiment, the threshold minimum value is set to zero, and in another embodiment, the threshold minimum value is set to a value that is not zero, and in an embodiment to a value that is greater than zero.

Although the technology described herein has been described above with particular reference to the storing of the data for the data array, as will be appreciated by those skilled in the art, the technology described herein also extends to the corresponding process of reading (and decoding) data that has been stored in the manner of the technology described herein.

Thus, another embodiment of the technology described herein comprises a method of determining the value of a data element of a data array for use in a data processing system, the method comprising:

using stored data representing a tree representing some or all of the data elements of the data array to determine the value of each node of a branch of the tree representing some or all of the data elements of the data array; and determining the value to be used for a data element of the data array by summing the determined values for the leaf node of the branch of the tree and for each preceding parent node in the branch of the tree that the leaf node belongs to.

Another embodiment of the technology described herein comprises an apparatus for determining the value of a data element of a data array for use in a data processing system, the apparatus comprising:

processing circuitry configured to:

use stored data representing a tree representing some or all of the data elements of the data array to determine the value of each node of a branch of the tree representing some or all of the data elements of the data array; and determine the value to be used for a data element of the data array by summing the determined values for the leaf node of the branch of the tree and for each preceding parent node in the branch of the tree that the leaf node belongs to.

In some embodiments, the processing circuitry may be in communication with one or more memory devices that store the data described herein and/or store software for performing the processes described herein. The processing circuitry may also be in communication with a display for displaying images based on the data described above.

As will be appreciated by those skilled in the art, these embodiments of the technology described herein can and in some embodiments do include any one or more or all of the optional features of the technology described herein, as appropriate.

Thus, for example, the tree representing some or all of the data elements of the data array is in an embodiment a quadtree, is in an embodiment a tree having one of the forms discussed above, and in an embodiment represents either the entire data array, or a block of a respective data array. Similarly, the data processing system is in an embodiment a graphics processing system or a display controller, and the data array in an embodiment comprises a texture map or a frame for display, and the data elements of the data array accordingly in an embodiment comprise texture elements and/or pixel and/or sampling position data values, respectively.

In an embodiment, the stored data representing the tree representing some or all of the data elements of the data array accordingly in an embodiment comprises data representing the differences between the values of respective parent and child nodes in the tree, and the value of a node of a branch of the tree accordingly is in an embodiment determined by determining the value of its parent node and then adding the difference value indicated for the node of the tree in the stored data representing the tree to the determined value for the parent node.

Again, it is believed that such an arrangement may be new and advantageous in its own right.

Thus, another embodiment of the technology described herein comprises a method of determining the value of a data element of a data array for use in a data processing system, the method comprising:

using stored data representing the differences between the values of respective parent and child nodes in a tree representing some or all of the data elements of the data array to determine the value of a node or nodes of the tree representing some or all of the data elements of the data array; and using the determined node values to determine the value to be used for a data element of the data array.

Another embodiment of the technology described herein comprises an apparatus for determining the value of a data element of a data array for use in a data processing system, the apparatus comprising:

processing circuitry configured to:

use stored data representing the differences between the values of respective parent and child nodes in a tree representing some or all of the data elements of the data array to determine the value of a node or nodes of the tree representing some or all of the data elements of the data array; and use the determined node values to determine the value to be used for a data element of the data array.

In some embodiments, the processing circuitry may be in communication with one or more memory devices that store the data described herein and/or store software for performing the processes described herein. The processing circuitry may also be in communication with a display for displaying images based on the data described above.

Similarly, in all these decoding embodiments of the technology described herein, there may be, in addition to data representing the tree node values (e.g. difference values), a set of data to be used for identifying the data for each respective node in the set of data indicating the tree node values. These decoding embodiments of the technology described herein accordingly in an embodiment further comprise using stored data to be used for identifying the data for each respective tree node in the set of data indicating the tree node values to identify the data for a given tree node within the stored set of data representing the tree node values. In an embodiment this comprises using stored data to determine the number of bits that have been used to represent (signal) the value of a node or nodes in the stored data representing the tree node values, and this stored "bit count" data is in an embodiment in the form of a "bit count" tree, as discussed above.

Again, it is believed that such decoding arrangements may be new and advantageous in their own right.

Thus, another embodiment of the technology described herein comprises a method of determining the value of a data element of a data array for use in a data processing system, the method comprising:

using data representing a tree indicating the number of bits used to indicate respective node values in a set of stored data that represents the node values of a tree representing some or all of the data elements of the data array to determine the number of bits used to indicate one or more node values in the stored data that represents the node values of the tree representing some or all of the data elements of the data array;

using the determined number of bits to identify the stored data representing the data values of a node or nodes of the tree representing some or all the data elements of the data array;

using the identified stored data representing the data values of a node or nodes of the tree representing some or all the data elements of the data array to determine the data values of a node or nodes of the tree representing some or all the data elements of the data array; and using the determined node values to determine the value to be used for a data element of the data array.

Another embodiment of the technology described herein comprises an apparatus for determining the value of a data element of a data array for use in a data processing system, the apparatus comprising:

processing circuitry configured to:

use data representing a tree indicating the number of bits used to indicate respective node values in a set of stored data that represents the node values of a tree representing some or all of the data elements of the data array to determine the number of bits used to indicate one or more node values in the stored data that represents the node values of the tree representing some or all of the data elements of the data array;

use the determined number of bits to identify the stored data representing the data values of a node or nodes of the tree representing some or all the data elements of the data array;

use the identified stored data representing the data values of a node or nodes of the tree representing some or all the data elements of the data array to determine the data values of a node or nodes of the tree representing some or all the data elements of the data array; and use the determined node values to determine the value to be used for a data element of the data array.

In some embodiments, the processing circuitry may be in communication with one or more memory devices that store the data described herein and/or store software for performing the processes described herein. The processing circuitry may also be in communication with a display for displaying images based on the data described above.

In the decoding embodiments of the technology described herein that use a bit count tree, then as discussed above, the bit count tree node values may be stored in the form of difference values between respective parent and child nodes in the bit count tree, and the bit count value indicated by a given node in the bit count tree is accordingly in an embodiment determined from the stored representation of the bit count tree by determining the bit count value for the parent node of the node in question in the bit count tree, and then adding the difference value indicated for the node of the bit count tree to the determined bit count value for a parent node.

The decoding method and apparatus of these embodiments of the technology described herein similarly may further comprise steps of identifying, or processing circuitry configured to identify, certain bit count values that indicate special cases, and to then process those special cases accordingly, as discussed above.

Thus, for example, in an embodiment, the decoding process comprises identifying whether a bit count value indicates that the value of the node of the tree representing the data array, and that the value of all the child nodes of the tree representing the data array below that node, have the same value as the parent node of the tree representing the data array for the node in question, and if so, determining the tree node values accordingly (i.e. assuming that the corresponding node of the tree representing the data array, and all the child nodes below that node in the tree representing the data array, have the same value as the parent node in the tree representing the data array for the node in question).

Similarly, there is in an embodiment a bit count tree value that indicates that all the child nodes of a node of the tree representing the data array have the same value as the node in question, and if the decoder identifies this bit count node value, in an embodiment it determines the child node values accordingly, i.e. assumes that all the child nodes of the node in question in the tree representing the data array have the same value as their parent node.

Similarly, in response to identifying a particular bit count value, the decoding process in an embodiment then determines from the stored data representing the tree representing the data array, a child node in the tree representing the data array that will have the same value as its parent node, and the sequence that the data values for the other child nodes of the parent node in question have been stored in the data representing the tree representing the data array.

Equally in an embodiment of the technology described herein, the decoding process employs arithmetic wrapping to determine the data element values.

It will be appreciated that in these decoding arrangements, the stored data representing the data array may be provided, e.g., via a storage medium or over the Internet, etc., to the processor, such as the graphics processor or display controller, that needs to use that data (and the decoding processor will then load the stored data and process it in the manner discussed above).

The apparatus for determining the value of a data element of the data array in a data processing system is in an embodiment incorporated in a graphics processor or a display controller.

The technology described herein also extends to a method and system that both stores and then decodes the data for the data array in the manners discussed above.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it could be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder, and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semi-conductor platform.

The technology described herein is particularly, but not exclusively, suitable for use in low power and portable devices. Thus, in an embodiment, the technology described herein is implemented in a portable device, such as a mobile telephone or PDA.

Similarly, the memory where the data representing the tree representing the data array is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on-chip, or in external memory, as desired). Similarly, in the case of a frame for the display, the memory is in an embodiment a frame buffer for the graphics processing system and/or for the display that the graphics processing system's output is to be provided to.

All the data representing the tree representing the data array is in an embodiment stored in the same physical memory, although this is not essential.

Other memory arrangements would, of course, be possible.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

The technology described herein is applicable to any suitable form or configuration of graphics processor and renderer, such as tile-based graphics processors, immediate mode renderers, processors having a "pipelined" rendering arrangement, etc.

It will also be appreciated by those skilled in the art that all of the described embodiments of the technology described herein can include, as appropriate, any one or more or all of the optional features of the technology described herein.

The methods in accordance with the technology described herein may be implemented at least partially using software e.g. computer programs. It will thus be seen that embodiments of the technology described herein comprise computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described herein also extends to a computer software carrier (or medium) comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

As discussed above, the technology described herein relates to the encoding and compression of data arrays for use in data processing systems, such as for use in graphics processing systems. A number of embodiments of the encoding and compression techniques used in the technology described herein will now be described.

FIG. 1 shows schematically an exemplary original data array 30 that may be encoded in the manner of the technology described herein. The array of data 30 is a two-dimensional data array containing a plurality of data elements (i.e. containing data array entries at a plurality of particular positions within the array). The data array 30 could be any suitable and desired array of data, such as data representing an image.

In a graphics processing context, the data array could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBA, or luminance and chrominance, values for the texel). In the case of a frame for display, each data entry (position) in the array will indicate a set of colour values (e.g. RGB values) to be used for displaying the frame on a display.

In the technology described herein, the data array 30 is encoded and compressed to provide a set of data representing the data array 30 that can then be stored in memory, and from which set of data, the data values of individual data elements in the data array 30 can be derived by decoding the data representing the data array 30.

An embodiment of the process for encoding and compressing the data array 30 will now be described.

In this embodiment, as shown in FIG. 1, to encode and compress the data array 30, the data array 30 is first divided into a plurality of non-overlapping, equal size and uniform blocks 31, each block corresponding to a particular region of the data array 30. In the present embodiment, each block 31 of the data array corresponds to a block of 16×16 elements (positions) within the data array 30 (i.e. a block of 16×16 texels in the case of a texture map). (Other arrangements would, of course, be possible.)

Each such block 31 of the data array 30 is then encoded to provide a compressed representation of the block 32 of the data array 30.

To do this, a particular form of quadtree representation representing the block 31 of the data array 30 is first generated. This is done as follows.

The quadtree is constructed to have a root node that represents the whole of the data block 31 (thus the whole 16×16 block in the present embodiment). That root node then has four child nodes, each representing a respective non-overlapping, uniform and equal-size 8×8 sub-block 32 of the 16×16 block 31 of the data array 30. Each such 8×8 sub-block representing child node then itself has four child nodes, each representing a respective non-overlapping, uniform and equal-size 4×4 sub-block 33 of the 8×8 sub-block 32, and so on, down to the 16 leaf nodes of the quadtree that will each represent respective individual data elements of the 16×16 block 31 of the data array 30.

The data value for each node of the quadtree is determined by performing two processing (data) passes.

In the first processing pass in this embodiment, each leaf node of the quadtree is initialised with (set to) the value of the data element of the block 31 of the data array 30 that the leaf node corresponds to. Each non-leaf node is then initialised with (set to) the minimum value of its child nodes (to the value of its lowest value child node). This calculation is performed from the bottom up.

A second processing pass is then performed, in which each node except the root node (which has no parent) has the value of its parent node subtracted from it. This is again done from the bottom-up.

The node values following this second processing pass are then the node values to be used for each node of the quadtree representing the block 31 of the data array 30.

The effect of this process is that the value of the data element in the data array that a leaf node represents will be given by the sum of the value for the leaf node and of the values all the preceding nodes along the branch of the quadtree that the leaf node resides on (in other words, to determine the value of a data element that a leaf node of the quadtree represents from the quadtree representation of the data array, the value for the leaf node and of the values all the preceding nodes along the branch of the quadtree that the leaf node resides on must be summed (added together)).

Figure 2:
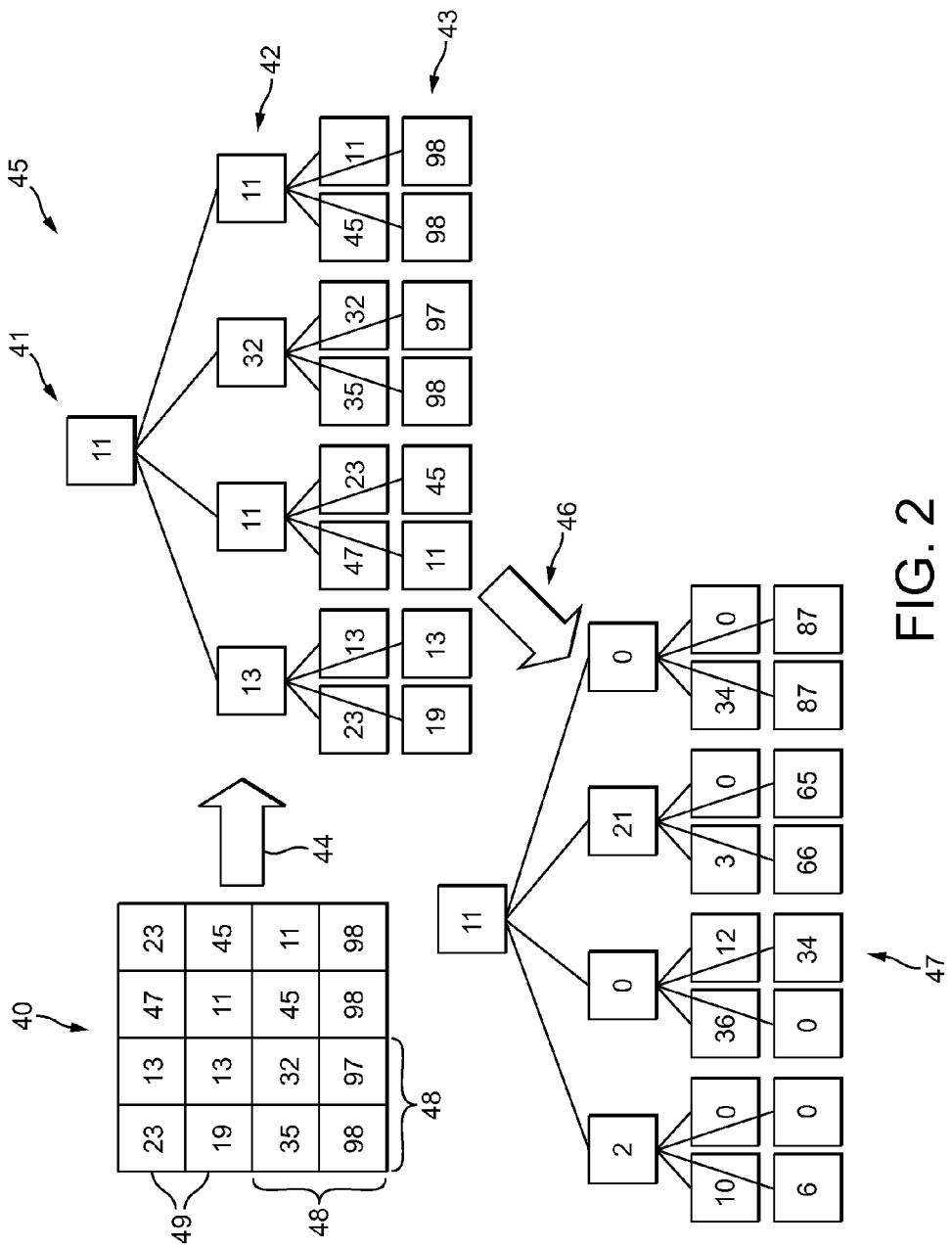
FIG. 2 shows schematically the generation of a quadtree representing an array of data elements in accordance with an embodiment of the technology described herein.

FIG. 2 illustrates the construction of such a quadtree for a representative 4×4 block 40 of data elements.

As shown in FIG. 2, the quadtree 45 representing the 4×4 array of data elements 40 has a root node 41, which has four child nodes 42, each corresponding to a respective 2×2 block 48 of the 4×4 block 40 of data elements. Each such child node 42 of the quadtree 45 then has 4 child nodes which form the leaf nodes 43 of the quadtree 45. The leaf nodes 43 of the quadtree 45 each correspond to a respective individual data element 49 of the 4×4 block 40 of data elements.

As shown in FIG. 2, and as discussed above, in a first processing pass 44 each of the leaf nodes 43 in the quadtree 45 is set to the value of its respective data element 49 in the block of data elements 40 (i.e. to the value of the data element 49 that the leaf node 43 corresponds to), and each non-leaf node 41, 42 in the tree 45 representing the data array 40 is set to the minimum value of its child nodes. This calculation is performed from the bottom-up.

Then, in a second processing pass 46, each node, except the root node 41 (which has no parent) has the value of its parent node subtracted from it. This is again done from the bottom-up.

The resulting node values 47 following this second processing pass are the node values for the tree representing the data array 40 that are stored to represent the data array 40.

In the present embodiment, a separate such quadtree representation is constructed for each different component (data channel) of the data elements of the data array that is being encoded. Thus, for example, in the case where each data element has four components, such as RGBA colour components, a separate quadtree representation of the form described above is constructed for each colour component, i.e. such that there will be a "red" component quadtree, a "green" component quadtree, a "blue" component quadtree, and an "alpha" component quadtree.

Once the value to be stored for each node of the quadtree representing the block of the data array has been determined in the above manner, a set of data representing those node values (and from which the node values can be determined) is then generated (which data can then be stored as an encoded and compressed version of the original data array block 31).

In the present embodiment, this is done by generating and storing data indicating the difference between respective parent and child node values in the quadtree representing the block of the data array. In other words, the data value that is actually stored for a node of the quadtree representing the block of the data array in the data representing the quadtree indicates the difference between the value of the node in question and its parent node. Thus, for some or all of the nodes in the tree, data indicating the difference between the value for the node in the tree, and the value of its parent node is generated (and then stored in the stored data representing the tree).

The value for a given node in the tree will then correspondingly be determined from the stored representation of the tree by determining the value for the parent node of the node in question and adding the difference value indicated for the node of tree to the determined value for the parent node.

Thus, in the present embodiment, once a "minimum value" quadtree representing a block 31 of the original data array 30 to be encoded has been determined as discussed above, a set of data representing that quadtree to be stored as the representation of the quadtree from which the values of the data elements in the block 31 of the original data array 30 that the tree represents are to be determined is generated by determining the differences between the values of respective parent and child nodes in the quadtree, and then generating data representative of those difference values (and from which the difference values can derived), which data is then stored as the data representing the quadtree.

Figure 3:
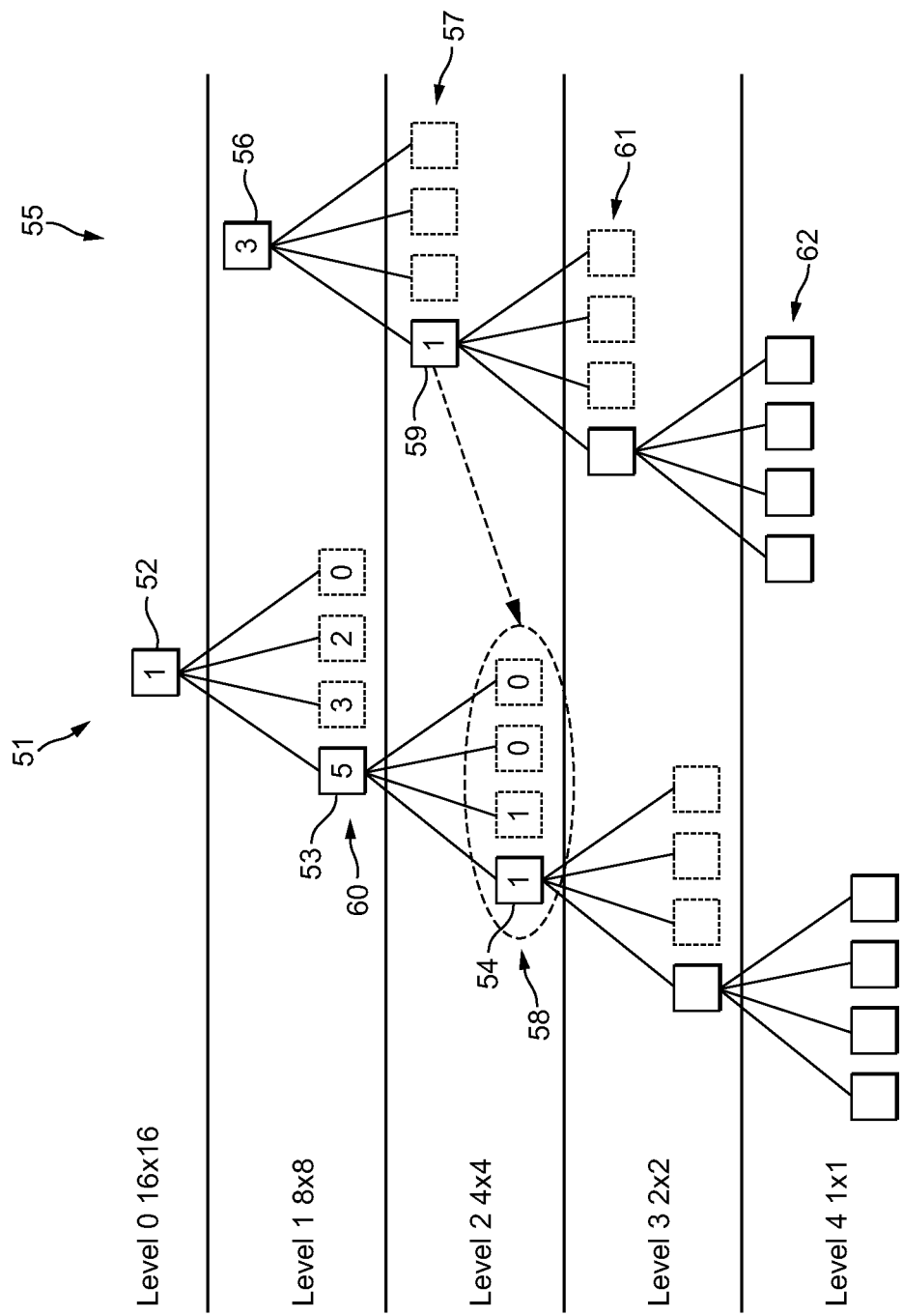
FIG. 3 shows schematically the use of difference values and a bit count quadtree to represent a quadtree representing a data array in an embodiment of the technology described herein.

The left-hand quadtree representation 51 in FIG. 3 shows, by way of illustration, the difference values that would be stored for some exemplary nodes of a quadtree representing an exemplary block of a data array. (FIG. 3 shows on the left-hand side respective exemplary difference values 51 to be stored for nodes of a quadtree representing a block of a data array (as discussed above), and on the right-hand side, a "bit count" quadtree 55 that indicates the amount of bits that have been used to signal the difference values in the quadtree to the left (this will be discussed in more detail below). The dotted line in FIG. 3 indicates the relationship between a node of the bit count tree 55 and the differential tree 51.)

As shown in FIG. 3, if it is assumed that the quadtree representing the data array has a root node value of 1 (following the generation of the node values using two processing passes as discussed above), the value to be stored for the root node 52 of the quadtree 51 that represents the 16×16 block of data elements will be set to 1.

If it is then assumed that the four child nodes 60 of that root node 52 have values 6, 4, 3 and 1, respectively, from left-to-right in FIG. 3, then the difference values that are accordingly stored for these child nodes 60 will be 5, 3, 2, and 0, respectively, as shown in FIG. 3. (For example, as the value for the root node of the quadtree representing the data elements is 1, and the first child node 53 of that root node 52 has a value 6, the difference to be stored is 5.)

Similarly, if the child nodes 58 of the first child node 53 of the root node 52 have values 7, 7, 6 and 6, respectively, from left-to-right in FIG. 3, the difference values that are accordingly stored for these child nodes 60 will be 1, 1, 0, and 0, respectively, as shown in FIG. 3.

Once the difference values to be stored for each node of the quadtree representing the block 30 of the data array have been determined (i.e. a quadtree of the form of the quadtree 51 shown on the left-hand side of FIG. 3 has been generated), a set of data representing that "difference value" quadtree is then generated using an entropy coding scheme.

The entropy coding process used in the present embodiment basically determines how many bits are to be used to signal the respective difference values for the quadtree representing the data array. Once this has been done, a set of data representing the quadtree representing the block of the data array that uses the determined number of bits to signal the respective difference values is generated and stored to represent the node values of the quadtree representing the block of the data array.

Furthermore, to facilitate decoding of that stored data representing the node values of the quadtree, a set of data indicating the number of bits that have been used to signal the respective difference values, which is also in the form of a quadtree, is also generated and stored.

Thus the coding and storage of the data representing the difference values for the nodes of the quadtree representing the block of the data array is based on a quadtree that is maintained in parallel with the tree representing the values of the data array, which quadtree represents (and allows to be derived) the number of bits that have been used to signal the differences for the children of a node of the quadtree representing the values of the data elements of the relevant block of the data array (and thus this parallel tree can accordingly be considered as a "bit count" tree).

This process will now be described with reference to FIG. 3, which shows in parallel to the quadtree 51 representing the node values of the quadtree representing the data elements of the block of the data array, a bit count quadtree 55 which indicates how many bits have been used to signal the difference values for the respective node values in the quadtree 51.

As shown in FIG. 3, the bit count quadtree 55 is constructed to have a root node 56 that indicates how many bits have been used to signal the difference between the value of the root node of the quadtree 51 representing the data array and each of its child nodes. Thus, in the example shown in FIG. 3, the root node 56 of the bit count quadtree 55 has a value 3, indicating that three bits have been used to signal the difference values for the child nodes 60 of the root node 52 of the quadtree 51 representing the data array (i.e. that three bits have been used to signal each such difference value that is indicated explicitly in the data representing the quadtree node values). This bit count quadtree root node 56 is set to indicate that three bits are used, because the highest difference between the root node 52 and one of its child nodes 60 in the quadtree representing the values of the data elements is 5 (for the child node 53), thereby requiring three bits to indicate that difference value.

It should be noted here that each difference value for the child nodes 60 of the root node 52 that is included explicitly in the data representing the node values of the quadtree representing the block of the data array will be signalled using three bits (as that is the bit count indicated by the root node 56 of the bit count quadtree 55), even if the actual difference value does not require as many as three bits to signal. Any redundant bits will be padded using zeros. This is the case for each respective bit count value indicated by a node of the bit count tree 55.

The next level down 57 in the bit count quadtree 55 has set as its node values the respective number of bits that have been used to signal the difference between each respective child node 60 of the root node of the quadtree indicating the data values and its child nodes. Thus, for example, because one bit is sufficient to signal all the differences between the child nodes 58 of the node 53 in the quadtree 51, the corresponding node 59 of the bit count quadtree 55 is set to 1 (as shown by the dashed line in FIG. 3).

It should be noted here that there is no need to include in the bit count tree a value indicating the number of bits that are used for the root node value of the tree representing the block of the data array, because the value for that root node is signalled using the number of bits that is required to write an uncompressed value for the component of the data array in question (i.e. if the data array uses 8-bit component, such as colour, values, then the root node value for the root node of the tree representing the values of the data array will be signalled using 8 bits). As the size (i.e. number of bits) used for the uncompressed components in the data array will be known, the number of bits used for the root node will accordingly be known.

(Although FIG. 3 only shows the values for certain nodes in the bit count quadtree 55 and the quadtree 51 representing the data values of the data array, as will be appreciated, in practice each bit count quadtree node and each node of the quadtree representing the values of the data array will have a value that will be set and determined in the manner of the present embodiment.)

In the present embodiment, the bit count quadtree 55 is encoded for storage by again storing the differences between node values in the bit count tree, rather than their actual values, as follows.

Firstly, the actual value of the root node for the bit count tree is stored for that node (i.e. the root node 56 of the bit count tree 55 is uncompressed). The number of bits used to signal the value of this node in the data representing the bit count quadtree is set to the number of bits that will be needed for the largest possible bit count that the root node of the bit count quadtree could be required to indicate. (For example, the bit count tree root node for a data array that uses 8-bit components will be sent as a 4-bit value, so that that root node of the bit count tree can indicate any value (any number of bits) between 0 and 8, since the largest possible difference between the root node and its child nodes in the data value indicating tree where 8-bit component values are being used will be 255, which would accordingly require 8 bits to signal (encode).)

Thus, for example, in the case of encoding a data array that uses 8-bit component values, the root node for the tree representing the data array values will be sent as an 8-bit value, indicating any number between 0 and 255. If the largest difference then to the 8×8 level is 23, the root node of the bit count tree will be set to the value 5, to indicate that 5 bits are needed (and used) in the data representing the tree representing the node values to represent that difference value of 23. The root bit count node value of 5 will be represented in the data representing the bit count tree using 4 bits (as the largest possible difference value when using 8-bit component values between respective levels in the tree representing the node values will be 255, which would require 8 bits to indicate, and so the root node of the bit count tree must contain enough bits to signal a value up to 8, i.e. 4 bits).

Then, the difference between the amount of bits required between the root 16×16 level and the 8×8 child node first level in the quadtree representing the data values and the amount of bits required between each 8×8 level node in the quadtree representing the data values and its child 4×4 nodes (which can be thought of as a level 2 bit count) is sent as a 2-bit signed value [−2, 1] (i.e. the value for the bit count quadtree for the child nodes 57 of the root node 56 of the bit count quadtree shown in FIG. 3 is indicated by using a signed 2-bit value to indicate the difference between the bit count of the respective child node 57 and the parent root node 56).

The same is then done for each successive level of the bit count quadtree 55. Thus, again, the bit counts for the next levels 61 and 62 in the bit count quadtree are each indicated using signed 2-bit values to indicate the difference between the bit count to be indicated by the respective child node 57 and the parent root node 56, and so on.

The above describes the layout and configuration of the bit count tree 55 and of the data that is stored for representing the bit count tree 55 in the present embodiment. The actual bit count tree values to use are determined as follow.

Firstly, once the (difference) value to be stored for each node of the tree representing the data array has been determined, as discussed above, the number of bits (the bit count) needed to indicate the respective (difference) value of each node of the tree representing the data array is determined.

However, in the present embodiment, these bit count values are not simply then used as the node values to be stored for (to populate) the bit count tree, because the Applicants have recognised that as the present embodiment uses a constrained, and fixed, number of bits (namely a 2-bit signed value) to indicate the bit counts for the respective nodes of the bit count tree, then the actual bit count (number of bits) required for indicating the value of a given node of the tree representing the data array may in fact be smaller or larger than what it is possible to signal with the fixed size bit count field to be used in the representation of the bit count tree.

To take account of this, the bit count quadtree 55 is constrained to make sure that the bit count to be signalled for each respective node in the bit count quadtree other than the root node is no smaller than the bit count of the node's largest child node minus one, and no smaller than the bit count of the node's parent node minus two.

This is achieved in the following manner. First, each node in the bit count quadtree is initialised to its "true" bit count value. Then, a first bottom-up pass is performed in which the bit count for each node of the bit count quadtree, except the root node, is constrained to be no smaller than the bit count of its largest child node minus 1. This is done by increasing the node's "true" bit count by whatever amount is necessary to satisfy the constraint.

Following this first pass, a top-down pass is then performed in which the current bit count for each node is constrained to be no smaller than the bit count of its parent node minus 2. This is again done by increasing the node's current bit count by whatever amount is necessary to satisfy the constraint.

The resulting node bit count values following the second pass are then the values that are associated with (set for) each node in the bit count tree. A set of data representing (encoding) the bit count tree in the manner discussed above is then generated and stored.

Once the bit count tree has been derived in this manner, the data representing the node values for the tree representing the data array can be generated and stored, using the configuration (and in particular the node value bit counts (field sizes)) corresponding to, and indicated by, the bit count tree. Thus the data representing the node values of the tree representing the data array will be configured such that for each node, the number of bits that is used to signal the difference value for that node in the data representing the node values of the tree representing the data array is the number of bits that the bit count tree indicates.

The effect of this then is that the data representing the node values of the tree representing the data array will be configured such that for each node, the number of bits that is used to signal the difference value for that node in the data representing the node values of the tree representing the data array is a number of bits (a bit count) that can be indicated using the fixed configuration of the bit count tree.

As in this arrangement the set of data representing the node values of the tree representing the data array must use the number of bits indicated by the bit count tree for respective node values, if necessary the stored data representing the node values is padded with zeros (or some other recognisable "dummy" bits) to achieve this.

The root node value in the set of data representing the node values of the tree representing the data array is signalled in this embodiment using the same amount (number) of bits as are used in the input data element format for the data array. As this number of bits is not signalled by the bit count tree, if necessary this number of bits used in the input data element format may be communicated to the decoder in some other way. For example, in a chip where different processing blocks communicate, this number of bits could be set to a data register in the processing block that has to decompress the data. Alternatively, for example for use in software encoding and decoding, a file header that contains the pixel format and information on how many bits are used could be associated with the data representing the data array. All the blocks for a given data array in the present embodiment for which tree representations are generated use the same size of root node.

In the present embodiment, certain bit count values that can be indicated by the bit count tree are used to indicate predetermined, special, cases of node values in the quadtree representing the block 31 of the data array. This is used to further compress the data representing the node values for the tree representing the block 31 of data array and the data representing the bit count tree (and thus to further compress the stored data that represents the tree representing the data array).

Firstly, the bit count value −1 is set aside for indicating (and predefined as indicating) that the value of the node of the tree representing the data array that that bit count node value corresponds to and that the value of all the child nodes of the tree representing the data array below that node, have the same value as the parent node of the tree representing the data array for the node in question.

In effect therefore, a bit count value of −1 will trigger the decoder to assume that the corresponding node of the tree representing the data array, and all the child nodes below that node in the tree representing the data array, have the same value as the parent node in the tree representing the data array for the node in question.

This then allows the data representing the bit count tree to efficiently indicate the situation where all the leaf node values along a branch of the tree representing the block 31 of the data array will be the same as a given value indicated for a node of the tree that is closer to the root node of the tree representing the block of the data array.

In this embodiment, when a node of the bit count tree is set to this bit count value −1 indicating that a node of the tree representing the data array, and that all the child nodes of the tree representing the data array below that node, have the same value as the parent node of the node of the tree representing the data array in question, then no bit count values are stored in the data representing the bit count tree for the nodes of the bit count tree that are below the node in question, and no node values are stored in the data representing the node values of the tree that represents the data array for the nodes of the tree representing the data array that are below the node in question. This is possible because as the lower level child node values will all be the same as the higher level parent node, any information relating to those child nodes is redundant and can therefore be omitted.

In effect therefore, this arrangement will trigger the decoder to assume that each lower level child node of the bit count tree also has its bit count node value set to the predetermined value, such as −1, that indicates that that node, and all the child nodes below that node, in the tree representing the data array have the same value as the parent node for the node in question.

Secondly, the bit count value 0 is set aside for indicating (and predefined as indicating) that all the child nodes of the node of the tree representing the data array that that bit count value corresponds to have the same value as the node in question. In effect therefore, a bit count value of 0 will trigger the decoder to assume that all the child nodes of the node in question in the tree representing the data array have the same value as their parent node.

This then allows the data representing the bit count tree to efficiently indicate the situation where all the child nodes of a node of the tree representing the data array will have the same value as their parent node in the tree representing the data array.

In this embodiment, when a node of the bit count tree is set to this bit count value 0 indicating that all the child nodes of a node of the tree representing the data array have the same value as their parent node, then no node values are stored in the data representing the node values of the tree that represents the data array for the child nodes of the node in question. Again, this is possible because as the child node values will all be the same as their parent node, any information relating to those child nodes is redundant and can therefore be omitted.

Thirdly, the bit count value 1 is set aside for indicating (and predefined as indicating) that the values of all the child nodes of the node of the tree representing the data array that that bit count value corresponds to differ from the value of that node of the tree representing the data array by zero or one.

This then allows the data representing the bit count tree to efficiently indicate the situation where all the child nodes of a node of the tree representing the data array will differ from the value of their parent node in the tree representing the data array by zero or one.

In this embodiment, when a node of the bit count tree is set to this bit count value 1, indicating that the values of all the child nodes of a node of the tree representing the data array differ from the value of their parent node by zero or one, then the node values for the child nodes of the node in question are represented in the data representing the node values of the tree that represents the data array using a bit map which has one bit for each child node. The value of each child node is then determined as the value of the parent node plus the value of the bit in the bit map for that node.

This allows the child node values to be indicated in an efficient manner in this situation.

The above describes (the encoding of) special cases where all the child nodes of a node of the tree representing the data array have the same value as, or only differ in value by one from, their parent node.

In the event that a child node of the tree representing the data array differs in value from its parent node by more than one, the following arrangement is used.

Firstly, the bit count value >=2 is set aside for this situation, i.e. for indicating (and predefined as indicating) that the value of at least one child node of the node of the tree representing the data array that that bit count value corresponds to differs from the value of that node of the tree representing the data array by more than one.

As discussed above (and as can be seen from FIG. 2, for example), even in this situation where at least one child node of a node of the tree representing the data array differs from the value of its parent node by more than one, in the present embodiment there will still be at least one other child node of that parent node (of the node in question) that has the same value as the parent node (as the node in question), because of the way that the tree representing the (block of the) data array is configured.

Thus, if a node of the tree representing the data array has a child node whose value differs from it by more than one, the encoding process first identifies a child node of that parent node (of the node of the tree representing the data array in question) that has the same value as that parent node (i.e. a "zero difference" child node), and then stores in the data representing the node values of the tree representing the data array, data representing the values of the other child nodes of the node in question, but does not store any data indicating the value of the identified "zero difference" child node.

Moreover, the difference values for the non-zero difference child nodes are stored in a predetermined sequence (order) in the data representing the node values of the tree representing the data array, depending upon which of the four child nodes is the "zero difference" child node. FIG. 4 illustrates this, and shows four predetermined node value storage sequences, depending upon which node is the designated "zero difference" child node Z. The values for the other nodes are stored in the sequence A, B, C.

This then means that a decoder can straightforwardly determine the order in which the data representing the node values is stored in the stored data representing the tree node values, once it knows which child node of a tree node is the "zero difference" child node for which no data value has been stored.

The designated "zero difference" child node is indicated (to the decoder) by including a 2-bit "zero child" designator (zerocd_1* in FIG. 4) in the set of data indicating the node values of the tree representing the (block of the) data array. This "zero child" designator is then followed by bit fields indicating the values of each of the three remaining child nodes of the node in question, in the predetermined order that is appropriate to the "zero child" node in question.

Thus, for example, where the bit count indicated by the bit count tree in this situation indicates that three bits are used for the difference values, the set of data indicating the values of the tree representing the block of the data array will contain a 2-bit "zero child" designator followed by three 3-bit fields signalling the difference values for the other three children of the node.

In operation to encode a data array 30 in the manner of the present embodiment, the data for the data array can be processed in any suitable and desired manner. For example, a suitable processor or processing circuitry may read the original data array to be compressed from memory, and/or receive a stream of data corresponding to the original data array to be compressed, and then process the stream of data accordingly, e.g. divide it into blocks, generate the necessary quadtrees, and then generate data representing the quadtree(s) and store that tree-representing data in memory, e.g. in memory and/or on a removable storage medium, etc.

As discussed above, in the present embodiment, this process will accordingly first comprise generating for the data array, or for each block that the data array has been divided into, a "minimum value" quadtree having the form described above, in which the leaf nodes of the tree correspond to respective data elements of the data array (or block of the data array). Then a bit count quadtree of the form described above is derived, based on the number of bits that are needed to indicate, and that will be used to indicate, the value of each node of the minimum value quadtree in a set of data representing the node values of that minimum value quadtree. A set of data representing that bit count quadtree of the form discussed above will then be generated, together with a set of data representing the node values of the minimum value quadtree (in the form of difference values), which set of node value indicating data is configured according to, and has the configuration indicated by, the corresponding bit count quadtree.

The process will further comprise identifying special cases of minimum value quadtree node values, as discussed above, and configuring the bit count quadtree to indicate those special cases, and the set of data representing the minimum value quadtree node values accordingly.

The so-generated set of data representing the tree node values and the set of data representing the corresponding bit count tree will then be stored appropriately for use as a compressed set of data representing the data array.

Figure 5:
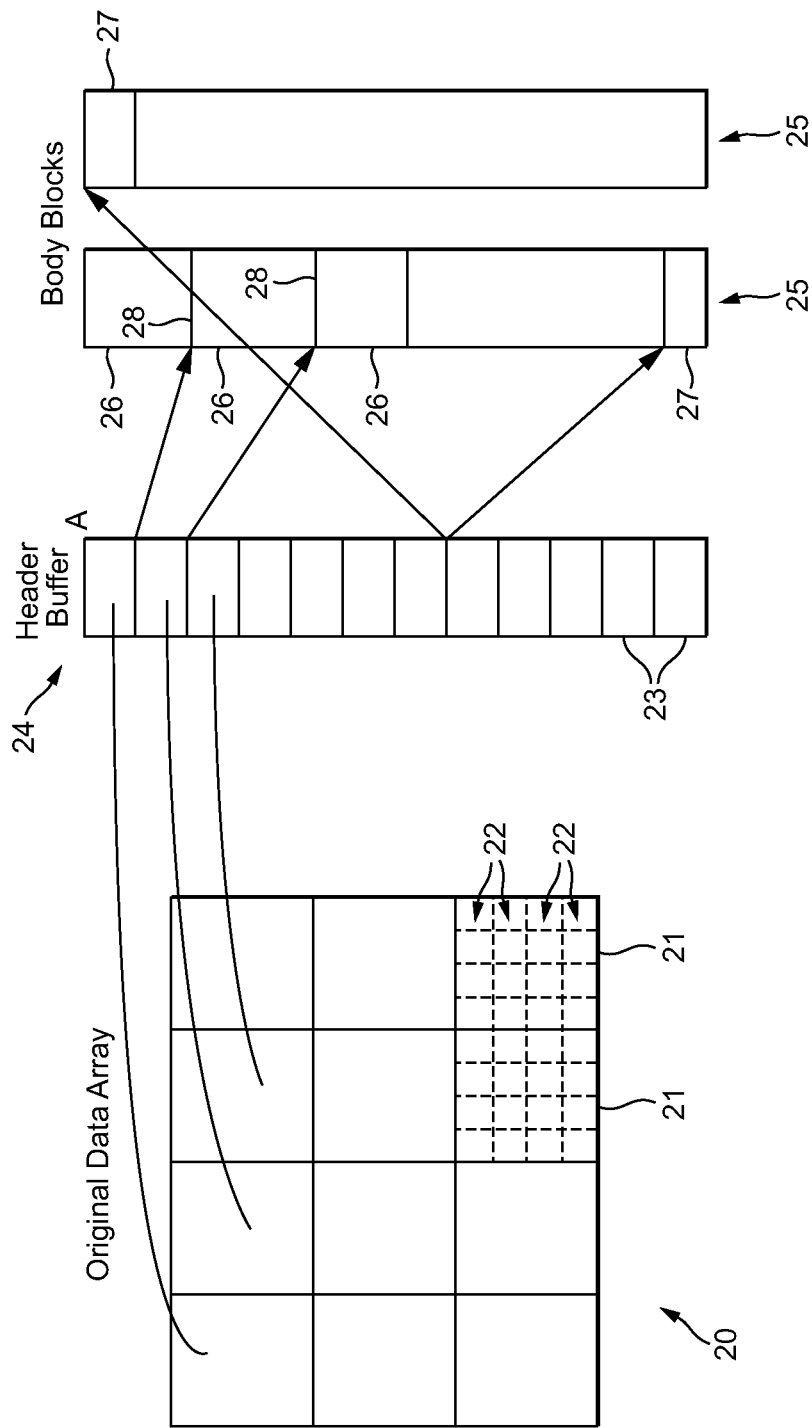
FIG. 5 shows schematically the storing of an array of data in an embodiment of the technology described herein.

FIG. 5 shows schematically an embodiment for storing the data that is generated to represent the data array in some embodiments of the technology described herein in memory.

FIG. 5 again shows schematically an array of original data 20 that is a two-dimensional data array containing a plurality of data elements (containing data entries at a plurality of particular positions within the array) and that is to be encoded and compressed and stored. As discussed above, the data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 5, to store the data array 20 in memory, the data array 20 is first divided into a plurality of non-overlapping, equal-size and uniform blocks 21, each block corresponding to a particular region of the data array 20. As discussed above, in the present embodiment, each block 21 of the data array corresponds to a block of 16×16 elements (positions) within the data array 20 (i.e. a block of 16×16 texels in the case of a texture map). (Again, other arrangements would, of course, be possible.)

Each block 21 that the data array 20 is divided into is further sub-divided into a set of sixteen non-overlapping, uniform and equal-size sub-blocks 22. In the present case, as each block 21 corresponds to 16×16 elements (positions) within the data array, each sub-block 22 accordingly corresponds to a 4×4 data element region within the block 21 (e.g. 4×4 texels in the case of a texture map). (FIG. 5 only shows the division of a few of the blocks 21 of the data array 20 into sub-blocks for simplicity. However, each and every block 21 that the original data array 20 is divided into is correspondingly sub-divided into a set of plural sub-blocks 22.)

To store the data array 20 in memory, firstly a header data block 23 is stored for each block 21 that the data array 20 has been divided into. These header data blocks are stored in a header buffer 24 in memory. The header buffer 24 starts at a start address A in memory, and the header data blocks 23 are each stored at a predictable memory address within the header buffer 24.

FIG. 5 shows the positions of the header data blocks 23 in the header buffer 24 for some of the blocks 21 that the data array 20 is divided into. Each block 21 that the data array 20 is divided into has a corresponding header data block 23 in the header buffer 24.

The position that each header data block 23 is stored at within the header buffer 24 is determined from (predicted from) the position within the data array of the block 21 that the header data block 23 relates to. In particular, the address of the header data block 21 in the header buffer 24 for a data array element (e.g. texel or pixel) at a position x, y within the data array 20 is given by:

$$\text{header data block address} = A + 64*(x/16 + (y*\text{xsize}/16)$$

where A is the start address of the header buffer, xsize and ysize are the vertical and horizontal dimensions, respectively, of the data array 20, and it is assumed that the data array 20 is divided into 16×16 blocks and each header data block occupies 64 bytes.

In the present embodiment, each header data block 23 in the header buffer 24 has the same, fixed size, corresponding to the burst-size used by the data processing system in which the stored data array is to be used. This means that the header data blocks 23 are of a size that can be fetched using a system-friendly burst size.

As well as storing a respective header data block 23 in the header buffer 24 for each block 21 that the original data 20 is divided into, the data storage arrangement of the present embodiment also stores data for each sub-block 22 that a given data block is divided into. This sub-block data is stored in memory in sub-block storage body blocks 25, which comprise in the present embodiment aligned blocks of 1024 bytes. (Having the body blocks storing the sub-block data in 1024 byte sub-block storage blocks provides the ability to encode the data array with several different encoders in parallel, by each encoder allocating a new block through a central repository every time it runs out of space.) In the present embodiment, the body blocks 25 are stored directly after the header buffer 24 (but may appear in random order there). This allows the pointer data in the header data blocks to be in the form of offsets from the end of the header buffer 24. (This is not essential, and the body blocks 25 may reside anywhere in memory, if desired)

The sets of data 26 for each respective set of sub-blocks are stored in the body blocks one after another, as shown in FIG. 5. This has the effect then that the data for a set of sub-blocks 22 for a given 16×16 block 21 can span two different body blocks 25 (as shown in FIG. 5 for the set 27 of sub-block data).

Figure 6:
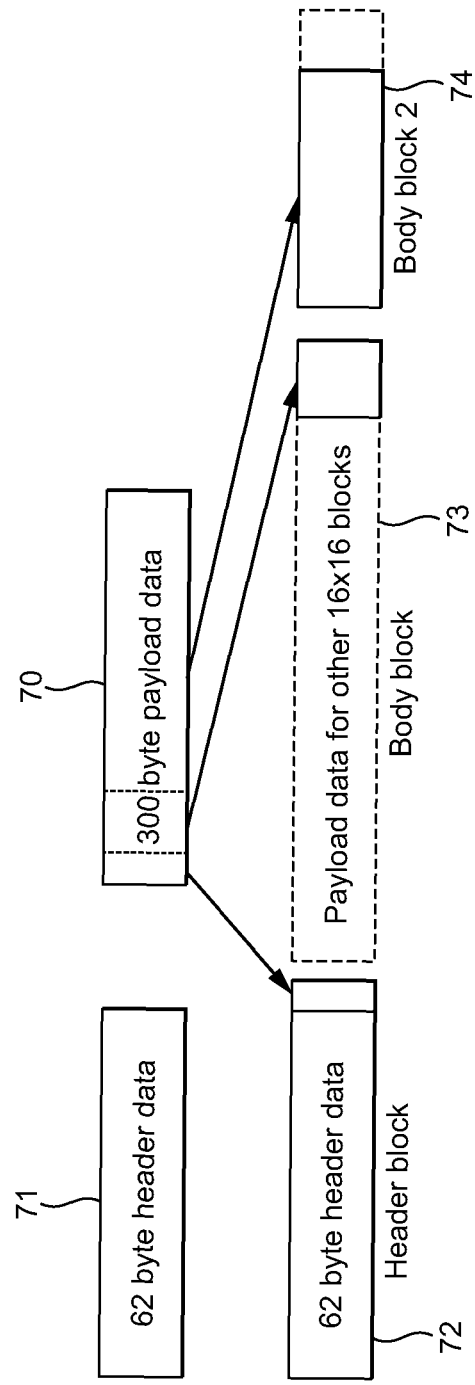
FIG. 6 shows schematically the distribution of data for a block of a data array between a header block and body blocks in memory in an embodiment of the technology described herein.

FIG. 6 shows this in more detail. If it is assumed that the "payload" data 70 to be stored for the set of 4×4 sub-blocks corresponding to a given 16×16 block of the data array comprises 300 bytes, and the header data 71 to be stored for the block comprises 62 bytes, as shown in FIG. 6, then if the header block 72 has a capacity of 64 bytes, the first two bytes of "payload" data will be stored in the header block, and then the remaining bytes of payload data distributed between one or two body blocks 73, 74 (depending upon the available space in the first body block). (Typically, the sub-block "payload" data will be stored in the header block and 0-2 body blocks, depending on the amount of that data and the available capacity in the respective header and body blocks.)

The header buffer 24 and body blocks 25 may be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and body blocks could also be copied to a local memory (e.g. cached), in use, if desired.

The data that is stored for each sub-block in the body blocks 25 comprises respective data from the encoded representation of the original data array that has been generated in the manner of the embodiments of the technology discussed above (i.e. data representing node values of a quadtree representing a respective block 21 of the data array 20, together with data representing a corresponding bit count quadtree).

Each header data block contains pointer data indicating the position within a body block 25 where the data for the sub-blocks for the block 21 that that header data block 23 relates to is stored. In the case where the sub-block data for a given data block spans two different body blocks (as illustrated in FIG. 5), the header data block 23 will contain a second pointer to indicate the position of the second body block in which the data for the set of sub-blocks is stored. In the present embodiment, this pointer comprises the upper 22 bits of a 1024 byte aligned address. (In the present embodiment, each header data block contains pointers to both a first and a second body block, irrespective of whether a given block's sub-block data will extend into a second body block. This is to allow for the fact that when the encoding process is started, it may not be known before the data is written to memory whether a second body block will be used or not.)

In the present embodiment, the pointer data in the header data blocks 23 indicates the start position 28 in the body block 25 in memory of the stored data 26 for the respective sub-blocks that the header data block relates to. In order to locate the data for the individual 4×4 sub-blocks, it is accordingly necessary for the decoder to be able to determine the location of the data for the individual 4×4 sub-blocks within the overall set of data 26 for the sub-blocks in question. This is achieved in the present embodiment by including in the header data block 23 the sizes of the stored data for each respective 4×4 sub-block (in bytes).

To locate the data for an individual 4×4 sub-block in a body block 25, the decoder then accordingly uses the pointer in the header data block 23 to determine the start position 28 of the data 26 for the set of sixteen 4×4 sub-blocks that the header data block 23 relates to in the body block 25, and then uses the size information in the header data block 23 to sum the sizes of the stored data for the 4×4 sub-blocks that are stored prior to the 4×4 sub-block of interest, to determine the start position for the data in the body block 25 for the sub-block of interest. The end position of the data for the sub-block of interest is correspondingly determined using the indicated stored data size for the sub-block in question.

If, after the pointer and sub-block size data has been included in a header data block 23, there is any remaining space in the header data block, then rather than leaving that space unused, it is filled with some of the encoded data representing the block of the original data array (such as the root node data for the block in question). Filling the header data blocks with other useful data such as this means that the header data blocks can be of a size that can be fetched using a system-friendly burst size, without wasting memory space.

In some cases, for example for single colour blocks, all the data needed to decode the block may be able to be carried in the unused header data block capacity (as in the case of single colour blocks, for example, only the root node values of the trees may need to be provided to the decoder). In this case there may be no data for the block that is send outside the header data block (and there may be unused space in the header data block).

In the present embodiment, 64-byte header data blocks are used, and the layout of the header data block is typically a 1 byte exact pointer to a body block (sub-block storage block), occupying e.g. 32 bits, one body block size-aligned pointer to a second body block (which can be 22 bits, as discussed above), 16 sets of sub-block size data (each typically occupying 6-bits), with the rest of the header data block filled with encoded sub-block data (which in the present embodiment is in an embodiment data for the upper layers of the quadtree indicating the node values and/or for the upper layers of the bit count tree).

In operation to store the encoded representation of the data array 20 in the manner of the present embodiment, suitably configured and/or programmed processing circuitry will receive and/or fetch from memory a stream of data representing the original data array 20, and operate to divide the data array 20 into blocks and sub-blocks as discussed above, generate appropriately encoded representations of the data array blocks and sub-blocks (in the manner discussed above), generate appropriate header data blocks and store those blocks in a header buffer 24, and generate appropriate sub-blocks containing data representing the encoded representations of the sub-blocks of the data array and store the data for those sub-blocks of the data array in body blocks 25 in memory.

The above primarily describes the way in the present embodiment that the encoded version of the data array is generated and stored in memory for use. When the so-stored data array comes to be used, for example to apply to fragments to be rendered (where the stored data array is a texture map for use in graphics processing), then the reading and decoding processes for the stored data array will essentially comprise the reverse of the above storing and encoding processes.

Thus, the decoding device, such as a graphics processor (e.g. where the stored data array is texture map) or a display controller (e.g., where the stored data array is a frame to be displayed), will first identify the position(s) of the particular element or elements in the data array that are of interest (i.e., whose values are to be determined). It will then determine the start address A of the header buffer for the stored data array (if necessary, this can be communicated to the decoder by the, e.g., software that controls the encoder and decoder setting a control register with a pointer to the header buffer), and then use that start address together with the position of the data array element or elements that are of interest to determine the location of the header data block for the block of the data array that the data element(s) falls within in the manner discussed above.

The decoder will then read the header data block from the identified memory location and determine therefrom the pointer data and sub-block size data indicating the memory location in the body blocks 25 of the relevant data representing the sub-block of the block of the data array that the data element or elements falls within. The decoder will then read the relevant sub-block data from the determined location in the body blocks 25, and any relevant sub-block data that is stored in the header data block (as discussed above).

Once the decoder has the necessary sub-block data, it can then decode that data to determine the value of the data element or elements of interest.

This decoding process will essentially be the reverse of the above-described encoding process. Thus, once the decoder has loaded the necessary data relating to the sub-block, it will first determine the required bit count tree node values from the stored data representing the bit count tree, and then use those determined bit count tree node values to identify the data for the relevant nodes of the quadtree representing the values of the data elements of the block of the data array of interest, and use those node values to determine the value of the data element or elements of interest.

As part of this process, the decoder will, accordingly, look at the bit count node values and identify the special cases discussed above (if present), for example, and interpret the stored data representing the quadtree representing the values of the data elements of the data block, and determine the values for the nodes of that quadtree, accordingly.

This process can then be repeated for each data element of interest (whose value is required).

Figure 7:
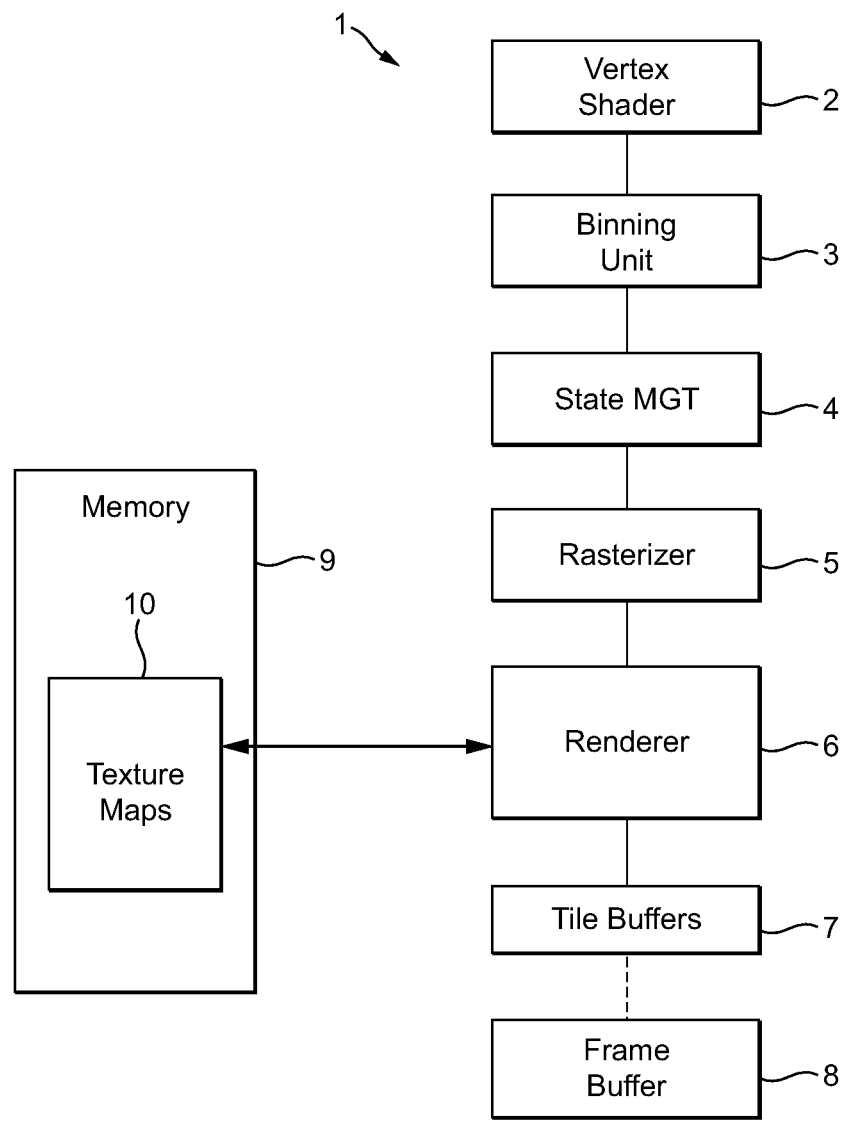
FIG. 7 shows schematically a graphics processing system that may use data arrays encoded in accordance with the technology described herein.

FIG. 7 shows schematically an arrangement of a graphics processing system 1 that can store and use data arrays that have been stored in the manner of the present embodiments.

FIG. 7 shows a tile-based graphics processing system. However, as will be appreciated, and as discussed above, the technology described herein can be implemented in other arrangements of graphics processing system as well (and, indeed, in other data processing systems).

The system includes, as shown in FIG. 7, a tile-based graphics processor (GPU) 1. This graphics processor 1 generates output data arrays, such as output frames intended for display on a display device, such as a screen or printer, in response to instructions to render graphics objects, etc. that it receives.

As shown in FIG. 7, the graphics processor 1 includes a vertex shader 2, a binning unit 3, a state management unit 4, a rasterising stage 5, and a rendering stage 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing units to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

As is known in the art, the rendering pipeline will include a number of different processing units, such as fragment shaders, blenders, texture mappers, etc.

In particular, as shown in FIG. 7, the rendering unit 6 will, inter alia, access texture maps 10 stored in a memory 9 that is accessible to the graphics processor 1, so as to be able to apply the relevant textures to fragments that it is rendering (as is known in the art). The memory 9 where the texture maps 10 are stored may be an on-chip buffer or external memory (e.g. main system memory) that is accessible to the graphics processor 1.

The graphics processor 1 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read by a display controller and output to a display device for display (not shown).

The graphics processing system shown in FIG. 7 uses the data array encoding and decoding and storing arrangement of the embodiments described above in respect of both the stored texture maps 10 in the memory 9, and when storing its output data in the frame buffer 8.

Thus, each texture map 10 that is stored in the memory 9 for use by the rendering unit 6 is stored in the form described above. Accordingly, when the rendering unit 6 needs to access a texture map, it will read and decode the texture map data in the manner described above.

Similarly, when the generated output data from the graphics processor 1 is written to the frame buffer 8 from the tile buffer 7, that data is processed in the manner described above, to take the data from the tile buffers 7 and store it in the format of some embodiments of the technology described herein in the frame buffer 8. This data can then be read and decoded from the frame buffer 8 in the manner described above by, e.g., the display controller (not shown) of the display on which the frame is to be displayed.

It will be appreciated that each of the stages, elements, and units, etc., of the graphics processor as shown in FIG. 7 may be implemented as desired and will accordingly comprise, e.g., appropriate circuitry, and/or processing logic, programmable logic, etc., for performing the necessary operations and functions, and will provide the appropriate control and processing circuitry, etc., for performing the technology described herein.

It will also be appreciated here that FIG. 7 simply shows the arrangements schematically, and thus, for example, the data flow in operation of the technology described herein need not and may not be as shown in FIG. 7, but may, for example, involve the looping back of data as between the various units and stages shown in FIG. 7 as appropriate.

A number of modifications and variations to the above described embodiments of the technology described herein would be possible.

For example, the data values for the data elements that are encoded in the quadtree could be transformed (converted) to a different form prior to generating the tree representing the data array, if desired.

For example, where the data array to be compressed uses an RGB format, the RGB data may be first transformed to a YUV format, and the so-transformed data in the YUV format then compressed and encoded in the manner of the present embodiments.

In such an arrangement, the YUV transform is in an embodiment of the form:

$$Y=\text{floor}((R+2*G+B)/4)$$

$$U=R+F-G$$

$$V=B+F-G$$

where F is a constant to avoid negative values, and is calculated from the size of G as:

$$F=1<<(\text{bit width of the } G \text{ component})$$

With this transform, the Y, U and V components will be expanded by 0-2 bits compared to their RGB counterparts.

(The inverse to this transform (to be used when decoding the encoded and compressed data representing the data array) is:
$G = (4*Y - U - V + 3 + 2*F)/4$
$R = U + G - F$
$B = V + G - F$
.)

Transforming RGB data to YUV data can simplify the coding of the chroma channels, as there may then be only one channel that will depict detail in the image (data array) instead of three. This can then mean that even if the amount of uncompressed data per data element is expanded, there will still be a gain once the data has been compressed in the manner of the present embodiments.

In an embodiment, the system of the technology described herein employs arithmetic wrapping, i.e. the result of all additions when calculating the value of a node in the tree representing the data array are calculated modulo (1<<bit depth of the (potentially yuv transformed) component).

Furthermore, in an embodiment when using such wrapping arithmetic, each parent node in the tree representing the data array is initialised to a value that is higher than the minimum value of its child nodes, and then differences relative to that higher value are stored for the child nodes, and arithmetic wrapping of the results used when the stored node values are summed to derive the actual child node values.

This can help to improve the rate of compression for certain forms of data array, for example, for arrays where the values that the data elements can take tend to fall into distinct groups, such as being either very bright or dark in images as could be the case, for example, for high contrast images, such as text and schematics.

For example, if the data array contains only the numbers 0 (dark) and 255 (white), then if using 8-bit arithmetic with arithmetic wrapping, it would be more efficient to initialise each parent node in the tree representing the data array to the maximum value of its child nodes (i.e. to 255, where a parent node has a child node having the value 255), rather than to the minimum value of its child nodes, and to rely on arithmetic wrapping (i.e. 255+1=0 when utilising 8-bit arithmetic) to generate the desired node values when decoding the stored data.

This will then allow smaller difference values (1 instead of 255) to be used to represent the node values in the data representing the node values of the tree representing the data array, and thus allow smaller numbers of bits to be used to describe (signal) the differences (the difference values) (i.e. 1 bit instead of 8 bits).

Thus, in an embodiment, the values that the non-leaf nodes in the tree representing the data array are initialised to are set so as to minimise the differences between those values (and thus the differences that will need to be stored for the nodes) when taking account of any wrapping arithmetic that is used in the system in question (and the system will rely on arithmetic wrapping to determine the actual node values when decoding the stored data).

It should be noted in these arrangements it doesn't necessarily have to be the maximum child node value that is used. For example, for a parent node having child nodes with the values 2, 250, 253 and 251, if using 8-bit arithmetic (i.e. such that the largest value is 256), setting the parent node to the child node value 2 would mean that the differences between the parent node and its child nodes would be 0, 248, 251 and 249, respectively. If the parent node is instead set to the child node value 250 and wrapping arithmetic is relied on, the differences to be stored will be 10, 0, 3 and 1, respectively. Since these difference values are smaller, they will require less bits to store. In this case, the parent node should be set to the value of the smallest value child node in the set of higher value child nodes.

In general, in these arrangements of the technology described herein, the parent node may be set to the value of its lowest value child node whose value is equal to or above a selected threshold minimum value. This can be seen from the above example, where the threshold minimum value would be 250, and so the parent node is set to the lowest value child node whose value equals or exceeds that selected threshold minimum value. This should take the wrapping arithmetic into account, such that the parent node will be set to the minimum value of its child nodes where there is no child node that has a value higher than the selected minimum threshold value.

In these arrangements, the threshold minimum value to use to exploit the arithmetic wrapping efficiently can be determined, for example, by binning some or all the leaf node values into a fixed amount of bins (such as four bins), and then setting the threshold minimum value set as being a value, and in an embodiment the minimum value, in the bin that has the lowest total distance (in normal counting order) to the other filled bins. In an embodiment the threshold minimum value is selected by binning (sorting) all the leaf node values (i.e. the data element values) in the data array or block of the data array for which the tree is being generated into groups (bins) of values, and then determining an appropriate minimum value on that basis.

For example, for a given set of leaf node values, the values of all the leaf nodes could be placed in four bins having, in the case of 8-bit arithmetic, values from 0-63, 64-127, 128-191 and 192-255. It could then be considered which of these bins have node values in them (in the above example there will be one node value in the first bin and three in the last bin), and the distance for each respective node value to the bins with data in them determined.

For example, with the above example leaf node values (i.e. data element values) of 2, 250, 253 and 251, if the value 2 which is in bin zero was selected as the threshold minimum node value to use, the distance between that "minimum value" bin and the other bins with leaf node values in them would be 0 (0→0) and 3 (0→3). If instead, the threshold minimum node value was set to a node value in the last bin (e.g. 250 as discussed above), the distances will be 0 (3→3) and 1(3→0, using wrapping). Similarly, if the leaf node values were such that there were leaf node values in the first and last two bins, the minimum distance from the first bin would be 0+2+3, while the total distance from the third bin would be 0+1+2 and from the fourth bin 0+1+3, i.e. the value to use for the threshold minimum node value should be the value in the third bin.

Once the selected minimum threshold value has been selected, then the value for each parent node in the tree representing the data array can be initialised to the value of its lowest value child node whose value is equal to or greater than the selected threshold minimum value. Once this has been done, the differences between the node values can be determined and data representing those differences stored, as discussed above. If the threshold minimum value has been selected appropriately, the difference values should be lower than would otherwise be the case if the wrapping arithmetic was not being exploited in this manner. The root node value will be set to the threshold minimum value (as it has no parent node from which to subtract its value from).

To determine the node values to use in these arrangement, if the selected minimum value is denoted as M, then working with 8-bit arithmetic, for each leaf node having a value p, one could initialise the leaf node with the value $p'=(p+256-m)$ modulo 256. This essentially sets the leaf nodes to the difference between their value p and the threshold M, taking account of the arithmetic wrapping. Each non-leaf node can then be set to the smallest value of its child nodes to build the tree representing the data array, and the root node set to the threshold minimum value M. Thus, an example with leaf node values of 2, 250, 253 and 251, and setting the threshold minimum value M to 250, would generate transformed leaf node values of 8, 0, 3, 1 (i.e. the respective difference values when compared to M) and the lowest of these difference values, 0, would be chosen as the value to set the parent node to (but the root node of the tree would be set to M=250 so that the tree will decompress correctly to its original form).

If desired, the use of the "zero child" arrangement discussed above can also be modified to provide a further compression gain. In particular, if two of the "non-zero" child nodes B and C that are geometrically closest to the zero value are typically smaller than the node A which is further away, then that can be used to map the concatenation of the upper two bits of A, B and C to a table with 64 entries. Twenty four of these entries (which represent the most common combinations) can then be mapped to thirty-two different 5-bit values (i.e. saving 1-bit), and the other forty entries will map to 8-bit values. The difference between the 8- and 5-bit values can be determined by looking at the first 2 bits of the value. For example if the first 2-bits are "11", then an 8-bit entry should be read for the look-up, but otherwise a 5-bit entry. When using appropriate look-up table entries for appropriate images, any penalty for the forty entries mapping to 8-bit values should be smaller than the gain that is derived from having 24 entries mapping to thirty-two different 5-bit values, thereby giving some reduction in the overall number of bits required.

Although the present embodiment has been described above as generating a tree representation for a 16×16 block of data elements, other arrangements could be used. For example, a separate tree representation could be generated for each 8×8 data element block of the data array, or for each 16×4 data element block of the data array (i.e. such that the data array will be divided into 8×8 or 16×4 blocks, respectively).

Also, although the present embodiments have been described above with particular reference to the use of the techniques of the present embodiment with graphics processors and display controllers, the techniques of the technology described herein can be used for other data array processing and in particular for other image processing arrangements.

For example, the techniques of the technology described herein may be used in image signal processors and video decoders and encoders (MPEG/h.264, etc.). In these cases, the techniques of the technology described herein could be used, for example, to encode an image generated by an image signal processor which is processing data received from an image sensor to make a watchable image out of it. A video encoder/decoder could, for example, decode images (video frames) encoded in the form of the technology described herein to then compress the image using some other standard like h.264, and correspondingly encode frames of video data using the technique of the technology described herein for provision, for example, to a graphics processor or a display controller.

As can be seen from the above, the technology described herein, in some embodiments at least, provides a method and apparatus for encoding data arrays that can allow the encoded data to take less memory space (to be stored more efficiently), reduce the amount of memory traffic for reading the encoded data, and/or make more efficient the memory traffic for reading the encoded data. It can accordingly, thereby reduce power consumption.

This is achieved, in some embodiments at least by representing the data array using a particular form of tree representation, together with a separate bit count tree indicating the number of bits that have been used to signal the value of the nodes in the tree representing the data elements of the data array. For example, by using a quadtree of the form described above to represent data elements of the data array, together with a bit count tree communicated by 2-bit differences for each node, and the node value elimination arrangements described above, the tree representing the data elements of the data array can be compressed in an efficient manner.

The data encoding arrangement of the technology described herein is particularly suited to use for textures and frame buffers, and can decrease external bandwidth as well as facilitating random access to the encoded data and being decodable at line speed for the texture cache. The arrangement of the technology described herein, in some embodiments at least, allows the efficient decoding of the data for a given block within an overall data array, and with little overhead.

The technology described herein, in some embodiments at least, in effect provides an entropy coding system for storing and representing a tree, such as a quadtree, representing all or part of a data array, i.e. an encoding system in which the syntax elements (such as the nodes of the tree representing the data array and of the bit count tree) are mapped to sequences of bits with a fixed length and may be placed in a continuous fashion in memory. This provides an efficient way of representing the data array with bit values.

Thus the technology described herein, in some embodiments at least, provides a way to efficiently and losslessly compress a data array in a way that allows fast decompression with a hardware-based decoder and fits well with a bus friendly memory layout. It can accordingly help to minimise the bandwidth required to communicate image data between different graphics producing and consuming nodes in a system on-chip, for example. This helps reduce issues with bus congestion and power requirements.

The technology described herein is advantageous over other possible entropy encoding schemes such as Huffman or arithmetic encoding, etc., because those schemes require, for example, more serial processing to determine where individual syntax elements can be located.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of encoding an array of data elements for storage in a data processing system, the method comprising:
   generating at least one tree representation for representing the array of data elements, the tree being configured such that each leaf node of the tree represents a respective data element of the data array, and the data values for the nodes of the tree being set such that the data value that the tree indicates for the data element of the data array that a leaf node of the tree represents is given by the sum of the data values in the tree for the leaf node and each preceding parent node in the branch of the tree that the leaf node belongs to; and
   generating and storing data representing the at least one tree representing the data array as an encoded version of the array of data elements.

2. The method of claim 1, further comprising:
dividing the data array into plural separate blocks, and generating a respective tree representation for each different block that the data array is divided into.

3. The method of claim 1, comprising determining the data values to be associated with each node of the at least one tree representation by:
setting, in a first processing pass, each leaf node in the tree to the value that the tree is to indicate for the data element in the data array to be encoded that the leaf node represents, and each non-leaf node in the tree to the value of one of its child nodes; and
then, in a second processing pass, subtracting from each node the value of its parent node.

4. The method of claim 3, wherein:
each non-leaf node is set to the value of its lowest value child node in the first processing pass.

5. The method of claim 3, further comprising:
selecting the values that the non-leaf nodes in the tree representing the data array are set to in the first processing pass so as to minimise the differences between those values when taking account of any wrapping arithmetic that is to be used to determine the node values when decoding the stored data.

6. The method of claim 1, wherein the step of generating and storing data representing the at least one tree representing the data array comprises:
generating data representing the at least one tree representing the data array by determining the differences between the values of respective parent and child nodes in the tree; and
storing data representative of the determined difference values as the set of data representing an encoded version of the array of data elements.

7. The method of claim 1, wherein:
the data that is generated and stored to represent the at least one tree representing the data array comprises a set of data representing the tree node values, together with a set of data indicating the number of bits that has been used for signalling the value for each node in the tree in the set of data representing the tree node values.

8. The method of claim 7, wherein:
one of the values that can be included in the set of data indicating the number of bits that have been used for signalling the value for each node in the tree in the set of data representing the tree node values is predefined as indicating that the value of a node of the tree representing the data array, and that the values of all the child nodes of the tree representing the data array below that node, are the same as the value of that node's parent node in the tree representing the data array, and no node values are stored in the data representing the node values of the tree that represents the data array for the nodes of the tree representing the data array that are below the node in question.

9. A method of generating an encoded version of an array of data elements for storage in a data processing system, the method comprising:
generating at least one tree representation for representing the array of data elements, the data values for the nodes of the tree being set such that data values for the data elements of the data array that the tree represents can be derived from the data values for the nodes of the tree;
generating data representing the node values of the at least one tree representing the data array;
generating at least one further tree representation in which the node values for the at least one further tree indicate the number of bits used to indicate respective node values in the data generated to represent the node values of the at least one tree representing the data array;
generating data representing the at least one further tree indicating the number of bits used to indicate the respective node values in the data generated to represent the node values of the at least one tree representing the data array; and
storing the generated data representing the node values of the at least one tree representing the data array and the generated data representing the at least one further tree indicating the number of bits used to indicate the respective node values in the data generated to represent the node values of the at least one tree representing the data array, as an encoded version of the array of data elements.

10. The method of claim 9, wherein:
the data that is generated and stored to represent the at least one further tree indicating the number of bits used to indicate the respective node values in the data generated to represent the node values of the at least one tree representing the data array comprises data representative of the differences between the values to be indicated by respective parent and child nodes in the at least one further tree indicating the number of bits used to indicate the respective node values in the data generated to represent the node values of the at least one tree representing the data array.

11. A method of determining the value of a data element of a data array for use in a data processing system, the method comprising:
using stored data representing a tree representing some or all of the data elements of the data array to determine the value of each node of a branch of the tree representing some or all of the data elements of the data array; and
determining the value to be used for a data element of the data array by summing the determined values for the leaf node of the branch of the tree and for each preceding parent node in the branch of the tree that the leaf node belongs to.

12. The method of claim 11, wherein:
the stored data representing the tree representing some or all of the data elements of the data array comprises data representing the differences between the values of respective parent and child nodes in the tree, and the value of a node of a branch of the tree is determined by determining the value of the node's parent node and then adding the difference value indicated for the node of the tree in the stored data representing the tree to the determined value for the parent node.

13. A method of determining the value of a data element of a data array for use in a data processing system, the method comprising:
using data representing a tree indicating the number of bits used to indicate respective node values in a set of stored data that represents the node values of a tree representing some or all of the data elements of the data array, to determine the number of bits used to indicate one or more node values in the set of stored data that represents the node values of the tree representing some or all of the data elements of the data array;
using the determined number of bits to identify the stored data representing the data values of a node or nodes of the tree representing some or all the data elements of the data array;
using the identified stored data representing the data values of a node or nodes of the tree representing some or all the data elements of the data array to determine the data values of a node or nodes of the tree representing some or all the data elements of the data array; and using the determined node values to determine the value to be used for a data element of the data array.

14. The method of claim 13, wherein:

data representing a tree indicating the number of bits used to indicate respective node values in a set of stored data that represents the node values of a tree representing some or all of the data elements of the data array, is stored in the form of difference values between respective parent and child nodes in a bit count tree, and the bit count value indicated by a node in the bit count tree is determined from the stored data by determining the bit count value for the parent node of the node in the bit count tree, and then adding the difference value indicated for the node of the bit count tree to the determined bit count value for its parent node.

15. An apparatus for encoding an array of data elements for storage in a data processing system, the apparatus comprising:

processing circuitry that generates at least one tree representation for representing the array of data elements, the tree being configured such that each leaf node of the tree represents a respective data element of the data array, the data values for the nodes of the tree being set such that the data value that the tree indicates for the data element of the data array that a leaf node of the tree represents is given by the sum of the data values in the tree for the leaf node and each preceding parent node in the branch of the tree that the leaf node belongs to, the processing circuitry generates and stores data representing the at least one tree representing the data array as an encoded version of the array of data elements.

16. The apparatus of claim 15, wherein:

the processing circuitry divides the data array into plural separate blocks and generate a respective tree representation for each different block that the data array is divided into.

17. The apparatus of claim 15, wherein:

the processing circuitry determines the data values to be associated with each node of the at least one tree representation by setting, in a first processing pass, each leaf node in the tree to the value that the tree is to indicate for the data element in the data array to be encoded that the leaf node represents, and each non-leaf node in the tree to the value of one of its child nodes; and then, in a second processing pass, subtracting from each node the value of its parent node.

18. The apparatus of claim 17, wherein:

each non-leaf node is set to the value of its lowest value child node in the first processing pass.

19. The apparatus of claim 17, wherein:

the processing circuitry selects the values that the non-leaf nodes in the tree representing the data array are set to in the first processing pass so as to minimise the differences between those values when taking account of any wrapping arithmetic that is to be used to determine the node values when decoding the stored data.

20. The apparatus of claim 15, wherein:

the processing circuitry generates and stores data representing the at least one tree representing the data array by generating data representing the at least one tree representing the data array by determining the differences between the values of respective parent and child nodes in the tree and storing data representative of the determined difference values as the set of data representing an encoded version of the array of data elements.

21. The apparatus of claim 15, wherein:

the data that is generated and stored to represent the at least one tree representing the data array comprises a set of data representing the tree node values, together with a set of data indicating the number of bits that has been used for signalling the value for each node in the tree in the set of data representing the tree node values.

22. The apparatus of claim 21, wherein:

one of the values that can be included in the set of data indicating the number of bits that have been used for signalling the value for each node in the tree in the set of data representing the tree node values is predefined as indicating that the value of a node of the tree representing the data array, and that the values of all the child nodes of the tree representing the data array below that node, are the same as the value of that node's parent node in the tree representing the data array, and no node values are stored in the data representing the node values of the tree that represents the data array for the nodes of the tree representing the data array that are below the node in question.

23. An apparatus for generating an encoded version of an array of data elements for storage in a data processing system, the apparatus comprising:

processing circuitry that generates at least one tree representation for representing the array of data elements, the data values for the nodes of the tree being set such that data values for the data elements of the data array that the tree represents can be derived from the data values for the nodes of the tree, processing circuitry generates data representing the node values of the at least one tree representing the data array, processing circuitry generates at least one further tree representation in which the node values for the at least one further tree indicate the number of bits used to indicate respective node values in the data generated to represent the node values of the at least one tree representing the data array, processing circuitry generates data representing the at least one further tree indicating the number of bits used to indicate the respective node values in the data generated to represent the node values of the at least one tree representing the data array, and processing circuitry stores the generated data representing the node values of the at least one tree representing the data array and the generated data representing the at least one further tree indicating the number of bits used to indicate the respective node values in the data generated to represent the node values of the at least one tree representing the data array, as an encoded version of the array of data elements.

24. The apparatus of claim 23, wherein:

the data that is generated and stored to represent the at least one further tree indicating the number of bits used to indicate the respective node values in the data generated to represent the node values of the at least one tree representing the data array comprises data representative of the differences between the values to be indicated by respective parent and child nodes in the at least one further tree indicating the number of bits used to indicate the respective node values in the data generated to represent the node values of the at least one tree representing the data array.

25. An apparatus for determining the value of a data element of a data array for use in a data processing system, the apparatus comprising:

processing circuitry that uses stored data representing a tree representing some or all of the data elements of the data array to determine the value of each node of a branch of the tree representing some or all of the data elements of the data array and determines the value to be used for a data element of the data array by summing the determined values for the leaf node of the branch of the tree and for each preceding parent node in the branch of the tree that the leaf node belongs to.

26. The apparatus of claim 25, wherein:

the stored data representing the tree representing some or all of the data elements of the data array comprises data representing the differences between the values of respective parent and child nodes in the tree, and the value of a node of a branch of the tree is determined by determining the value of the node's parent node and then adding the difference value indicated for the node of the tree in the stored data representing the tree to the determined value for the parent node.

27. An apparatus for determining the value of a data element of a data array for use in a data processing system, the apparatus comprising:

processing circuitry that uses data representing a tree indicating the number of bits used to indicate respective node values in a set of stored data that represents the node values of a tree representing some or all of the data elements of the data array to determine the number of bits used to indicate one or more node values in the stored data that represents the node values of the tree representing some or all of the data elements of the data array, the processing circuitry uses the determined number of bits to identify the stored data representing the data values of a node or nodes of the tree representing some or all the data elements of the data array, the processing circuitry uses the identified stored data representing the data values of a node or nodes of the tree representing some or all the data elements of the data array to determine the data values of a node or nodes of the tree representing some or all the data elements of the data array, and the processing circuitry uses the determined node values to determine the value to be used for a data element of the data array.

28. The apparatus of claim 27, wherein:

data representing a tree indicating the number of bits used to indicate respective node values in a set of stored data that represents the node values of a tree representing some or all of the data elements of the data array, is stored in the form of difference values between respective parent and child nodes in a bit count tree, and the bit count value indicated by a node in the bit count tree is determined from the stored data by determining the bit count value for the parent node of the node in the bit count tree, and then adding the difference value indicated for the node of the bit count tree to the determined bit count value for its parent node.

29. A non-transitory computer readable storage medium storing computer software code which when executing on a processor performs a method of encoding an array of data elements for storage in a data processing system, the method comprising:

generating at least one tree representation for representing the array of data elements, the tree being configured such that each leaf node of the tree represents a respective data element of the data array, and the data values for the nodes of the tree being set such that the data value that the tree indicates for the data element of the data array that a leaf node of the tree represents is given by the sum of the data values in the tree for the leaf node and each preceding parent node in the branch of the tree that the leaf node belongs to; and generating and storing data representing the at least one tree representing the data array as an encoded version of the array of data elements.

30. A non-transitory computer readable storage medium storing computer software code which when executing on a processor performs a method of generating an encoded version of an array of data elements for storage in a data processing system, the method comprising:

generating at least one tree representation for representing the array of data elements, the data values for the nodes of the tree being set such that data values for the data elements of the data array that the tree represents can be derived from the data values for the nodes of the tree;

generating data representing the node values of the at least one tree representing the data array;

generating at least one further tree representation in which the node values for the at least one further tree indicate the number of bits used to indicate respective node values in the data generated to represent the node values of the at least one tree representing the data array;

generating data representing the at least one further tree indicating the number of bits used to indicate the respective node values in the data generated to represent the node values of the at least one tree representing the data array; and storing the generated data representing the node values of the at least one tree representing the data array and the generated data representing the at least one further tree indicating the number of bits used to indicate the respective node values in the data generated to represent the node values of the at least one tree representing the data array, as an encoded version of the array of data elements.

* * * * *